United States Patent
Stout et al.

(10) Patent No.: US 10,484,091 B2
(45) Date of Patent: Nov. 19, 2019

(54) LIGHT-BASED FIDUCIAL COMMUNICATION

(71) Applicants: Barry Stout, Beverly, MA (US); Christian Breuer, Dortmund (DE); Yang Li, Georgetown, MA (US)

(72) Inventors: Barry Stout, Beverly, MA (US); Christian Breuer, Dortmund (DE); Yang Li, Georgetown, MA (US)

(73) Assignee: OSRAM SYLVANIA Inc., Wilmington, MA (US)

(*) Notice: Subject to any disclaimer, the term of this patent is extended or adjusted under 35 U.S.C. 154(b) by 0 days.

(21) Appl. No.: 15/636,653

(22) Filed: Jun. 29, 2017

(65) Prior Publication Data

US 2019/0007135 A1 Jan. 3, 2019

(51) Int. Cl.
*H04B 10/116* (2013.01)
*H04B 10/114* (2013.01)
(Continued)

(52) U.S. Cl.
CPC .......... *H04B 10/116* (2013.01); *G01C 3/08* (2013.01); *G01C 21/206* (2013.01); *G01S 1/70* (2013.01);
(Continued)

(58) Field of Classification Search
CPC .............. H04B 10/0795; H04B 10/114; H04B 10/1149; H04B 10/116; H04B 10/501;
(Continued)

(56) References Cited

U.S. PATENT DOCUMENTS 7,204,596 B2 * 4/2007 Tamura ................ H04N 5/7416
345/647
8,662,398 B1 * 3/2014 Egyed .................. H04B 10/116
235/462.01
(Continued)

FOREIGN PATENT DOCUMENTS

| EP | 2924892 A1 | 9/2015 |
| WO | 2014038944 A2 | 3/2014 |
| WO | 2017096360 A1 | 6/2017 |

OTHER PUBLICATIONS

Nishimura et al; Image capture using a fiducial reference pattern; Mar. 15, 2007; United States Patent and Trademark Office; pp. 1-19.*

(Continued)

*Primary Examiner* — Amritbir K Sandhu
(74) *Attorney, Agent, or Firm* — Yutian Ling

(57) ABSTRACT

Techniques and architecture are disclosed for navigating an area with multi-panel luminaires configured to display fiducial patterns. In an embodiment, a system includes a plurality of luminaires located in an area and configured to display one or more fiducial patterns recognizable by a mobile computing device. The luminaire includes a plurality of panels, each panel associated with one or more solid-state light sources. The luminaire also includes at least one driver configured to control the light sources to transmit light through the plurality of panels at varying light intensities to display a fiducial pattern and configured to detect errors in the display of the fiducial pattern.

21 Claims, 14 Drawing Sheets

(51) Int. Cl.
| | |
|---|---|
| H04B 10/079 | (2013.01) |
| H04B 10/50 | (2013.01) |
| H04B 10/516 | (2013.01) |
| H04B 10/556 | (2013.01) |
| H04J 14/08 | (2006.01) |
| H04J 3/10 | (2006.01) |
| H05B 33/08 | (2006.01) |
| H05B 37/02 | (2006.01) |
| G01C 21/20 | (2006.01) |
| G01C 3/08 | (2006.01) |
| G01S 1/70 | (2006.01) |
| G01S 11/12 | (2006.01) |
| G01S 5/16 | (2006.01) |
| G06K 9/34 | (2006.01) |
| G06K 9/46 | (2006.01) |
| G06K 9/62 | (2006.01) |
| G06T 7/90 | (2017.01) |
| H04N 5/353 | (2011.01) |

(52) U.S. Cl.
CPC ............ *G01S 5/163* (2013.01); *G01S 11/12* (2013.01); *G06K 9/34* (2013.01); *G06K 9/4661* (2013.01); *G06K 9/6218* (2013.01); *G06T 7/90* (2017.01); *H04B 10/0795* (2013.01); *H04B 10/114* (2013.01); *H04B 10/1149* (2013.01); *H04B 10/501* (2013.01); *H04B 10/502* (2013.01); *H04B 10/516* (2013.01); *H04B 10/5563* (2013.01); *H04J 3/10* (2013.01); *H04J 14/086* (2013.01); *H04N 5/3532* (2013.01); *H05B 33/089* (2013.01); *H05B 33/0845* (2013.01); *H05B 37/029* (2013.01); *G06T 2207/10004* (2013.01); *G06T 2207/20021* (2013.01)

(58) Field of Classification Search
CPC ................ H04B 10/502; H04B 10/516; H04B 10/5563; H04J 14/086; H04J 3/10; H04N 5/3532; H05B 33/0845; H05B 33/089; H05B 37/029
USPC ................................. 398/118, 120, 129, 131
See application file for complete search history.

(56) References Cited

U.S. PATENT DOCUMENTS

| | | | | |
|---|---|---|---|---|
| 10,069,572 | B1* | 9/2018 | Breuer | H04B 10/1141 |
| 10,117,316 | B1* | 10/2018 | Stout | H05B 37/0272 |
| 2007/0058881 | A1* | 3/2007 | Nishimura | G02B 27/0025 |
| | | | | 382/275 |
| 2008/0007948 | A1* | 1/2008 | Fenyo | A61N 5/0616 |
| | | | | 362/235 |
| 2009/0048510 | A1* | 2/2009 | Miller | G01N 23/223 |
| | | | | 600/426 |
| 2013/0038219 | A1* | 2/2013 | Dau | H05B 33/0845 |
| | | | | 315/151 |
| 2014/0097761 | A1* | 4/2014 | Chen | H05B 33/0893 |
| | | | | 315/192 |
| 2014/0255038 | A1* | 9/2014 | Richards, IV | H04B 10/116 |
| | | | | 398/118 |
| 2014/0286644 | A1* | 9/2014 | Oshima | H04B 10/11 |
| | | | | 398/118 |
| 2014/0293276 | A1* | 10/2014 | Hughes | G01J 1/4204 |
| | | | | 356/222 |
| 2014/0327364 | A1 | 11/2014 | Bischof et al. | |
| 2014/0354178 | A1* | 12/2014 | Siessegger | H05B 33/0806 |
| | | | | 315/294 |
| 2014/0355048 | A1* | 12/2014 | Kang | G06F 3/1292 |
| | | | | 358/1.15 |
| 2015/0279207 | A1* | 10/2015 | Breuer | G08C 19/16 |
| | | | | 398/106 |
| 2015/0280829 | A1 | 10/2015 | Breuer et al. | |
| 2015/0282282 | A1* | 10/2015 | Breuer | H05B 37/0272 |
| | | | | 315/152 |
| 2016/0019495 | A1* | 1/2016 | Kolchin | G06Q 10/0833 |
| | | | | 705/333 |
| 2016/0019831 | A1 | 1/2016 | Hall | |
| 2016/0164604 | A1* | 6/2016 | Liu | H04B 10/116 |
| | | | | 398/118 |
| 2016/0308328 | A1* | 10/2016 | Sakamoto | H01S 3/067 |
| 2016/0359558 | A1* | 12/2016 | Baggen | H04B 10/116 |
| 2017/0077085 | A1* | 3/2017 | Simin | H01L 27/0266 |
| 2017/0243228 | A1* | 8/2017 | Wang | G06K 9/00449 |
| 2018/0041273 | A1* | 2/2018 | Chiang | H04B 10/116 |
| 2018/0054870 | A1* | 2/2018 | Yanagizu | B60Q 1/04 |
| 2018/0095359 | A1* | 4/2018 | Jeong | G03F 7/70091 |
| 2019/0007135 | A1* | 1/2019 | Stout | H04B 10/116 |
| 2019/0014250 | A1* | 1/2019 | Stout | H04N 5/2354 |

OTHER PUBLICATIONS

"Cyclic Redundancy Check," Wikipedia, available at https://en.wikipedia.org/wiki/Cyclic_redundancy_check (last accessed Jun. 29, 2017).

"Fiducial Marker," Wikipedia, available at https://en.wikipedia.org/wiki/Fiducial_marker (last accessed Dec. 9, 2016).

"QR Code," Wikipedia, available at https://en.wikipedia.org/wiki/QR_code (last accessed Jun. 29, 2017).

Aggarwal, Anant, "State of the art in Visible Light Communication & Indoor Navigation," Osram Sylvania Inc., Oct. 23, 2013.

Heiner, Christoph, International Search Report and Written Opinion of the International Searching Authority, for counterpart application PCT/US2018/037276, dated Nov. 21, 2018, European Patent Office, Rijswijk, The Netherlands, 18 pages.

* cited by examiner

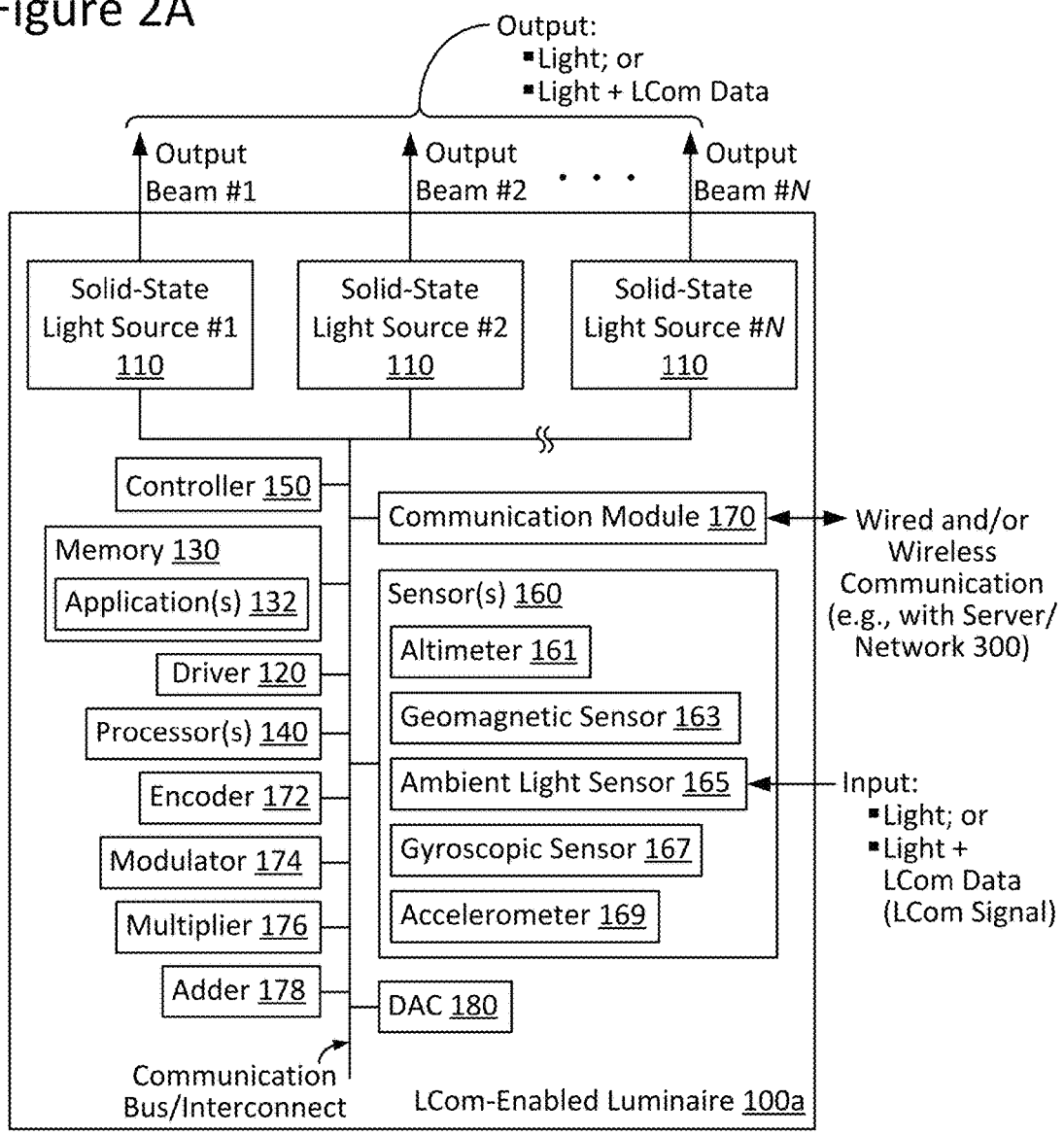

LIGHT-BASED FIDUCIAL COMMUNICATION

FIELD OF THE DISCLOSURE

This disclosure relates to solid-state lighting (SSL), and more particularly to light-based fiducial communication via SSL.

BACKGROUND

Indoor navigation systems commonly use physical signs and/or radio-frequency (RF) signals to facilitate navigation of buildings or structures. Physical signs may be located throughout a building, such that users can observe each sign along a path to a desired location within the building. RF based navigation systems involve communication signals, such as Wi-Fi signals, for exchanging navigation information with one or more users of the system. These systems often include several RF transmitters (e.g., a BLUETOOTH® Beacon) configured to communicate with users located in or about a building. To ensure sufficient access to the system, these transmitters may be positioned throughout the building.

SUMMARY

One example embodiment of the present disclosure provides a luminaire including a plurality of panels, each panel associated with one or more solid-state light sources, in which the one or more solid-state light sources are configured to produce light, and at least one driver configured to control the one or more solid-state light sources to transmit light through the plurality of panels at varying light intensities to display a first fiducial pattern recognizable by a mobile computing device, in which the first fiducial pattern represents position information, and detect an error in the display of the first fiducial pattern.

In some embodiments, the plurality of panels includes at least one fault indicator panel configured to indicate an error in the display of the first fiducial pattern to the mobile computing device. In some embodiments, the fault indicator panel is illuminated and forms part of the first fiducial pattern when there is no error in the display of the first fiducial pattern. In some embodiments, the luminaire further includes a communication module configured to communicate with a computing system, in which the computing system is configured to detect an error in the display of the first fiducial pattern. In some embodiments, in response to detecting an error in the display of the first fiducial pattern, the driver is further configured to control the one or more solid-state light sources to display a second fiducial pattern in place of the first fiducial pattern. In some embodiments, the driver is further configured to detect an error in the first fiducial pattern based on a change in electrical current to the one or more solid-state light sources. In some embodiments, the driver is further configured to control the one or more solid-state light sources to display a coarse fiducial pattern and a fine fiducial pattern, in which the coarse fiducial pattern represents fewer bits of information than the fine fiducial pattern. In some embodiments, the first fiducial pattern defines a shape such that a relative position of a mobile computing device from the luminaire is determined based on the shape of the first fiducial pattern. In some embodiments, the driver is further configured to operate the luminaire in a first mode and a second mode, in which the first mode includes operating the one or more solid-state light sources at a first light intensity level and the second mode includes operating the one or more solid-state light sources at a second light intensity level different from the first light intensity level in order to display the first fiducial pattern. In some embodiments, the first light intensity level is a full light intensity level and the first mode further includes modulating the frequency of light output to provide one or more light-based communication messages.

Additional embodiments disclosed herein include a system for navigating an area. The system includes a plurality of multi-panel luminaires located in the area, each multi-panel luminaire configured to display a fiducial pattern recognizable by a mobile computing device, in which the fiducial pattern represents position information, and a computing system in communication with the plurality of multi-panel luminaires via a network and configured to detect an error in the display of at least one fiducial pattern displayed by at least one multi-panel luminaire.

In some embodiments, each multi-panel luminaire further includes a plurality of panels, each panel associated with one or more solid-state light sources, in which the one or more solid-state light sources are configured to produce light, and at least one driver configured to control the one or more solid-state light sources by varying light intensities to display the fiducial pattern. In some embodiments, each multi-panel luminaire further includes a fault indicator panel configured to indicate an error in the display of the fiducial pattern. In some embodiments, the computing system detects the error based on one of a feedback input from the mobile computing device and a change in electrical current identified by the at least one driver of the plurality of multi-panel luminaires. In some embodiments, the computing system is further configured to transmit instructions to a first multi-panel luminaire and in response the first multi-panel luminaire adjusts the displayed fiducial pattern from a first fiducial pattern produced by a first combination of solid-state light sources to a second fiducial pattern produced by a second combination of solid-state light sources. In some embodiments, the instructions are transmitted in response to detecting an error in the display of the fiducial pattern by the first multi-panel luminaire. In some embodiments, in response to detecting the error the computing system is further configured to update at least one of a map and database content stored on the computing system, in which the mobile computing device uses at least the map and the database content to adjust a received image of the fiducial pattern on the mobile computing device.

Additional embodiments disclosed herein includes a luminaire that includes a housing with one or more solid-state light sources disposed therein, at least one driver configured to control the one or more solid-state light sources to produce an output of light, and a mask attached to the housing and positioned over at least one of the solid-state light sources, the mask defining one or more panels configured to transmit the output of light to display a fiducial pattern that is recognizable by a mobile computing device, in which the fiducial pattern represents position information.

In some embodiments, the luminaire further includes a diffuser attached to the housing and positioned between the solid-state light sources and the mask. In some embodiments, the mask further includes one or more polarized lenses that polarize light produced by the solid-state light sources such that the fiducial pattern is not visually detectable by a human eye.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 2A is a block diagram illustrating an LCom-enabled luminaire configured in accordance with an embodiment of the present disclosure.

Figure 1:
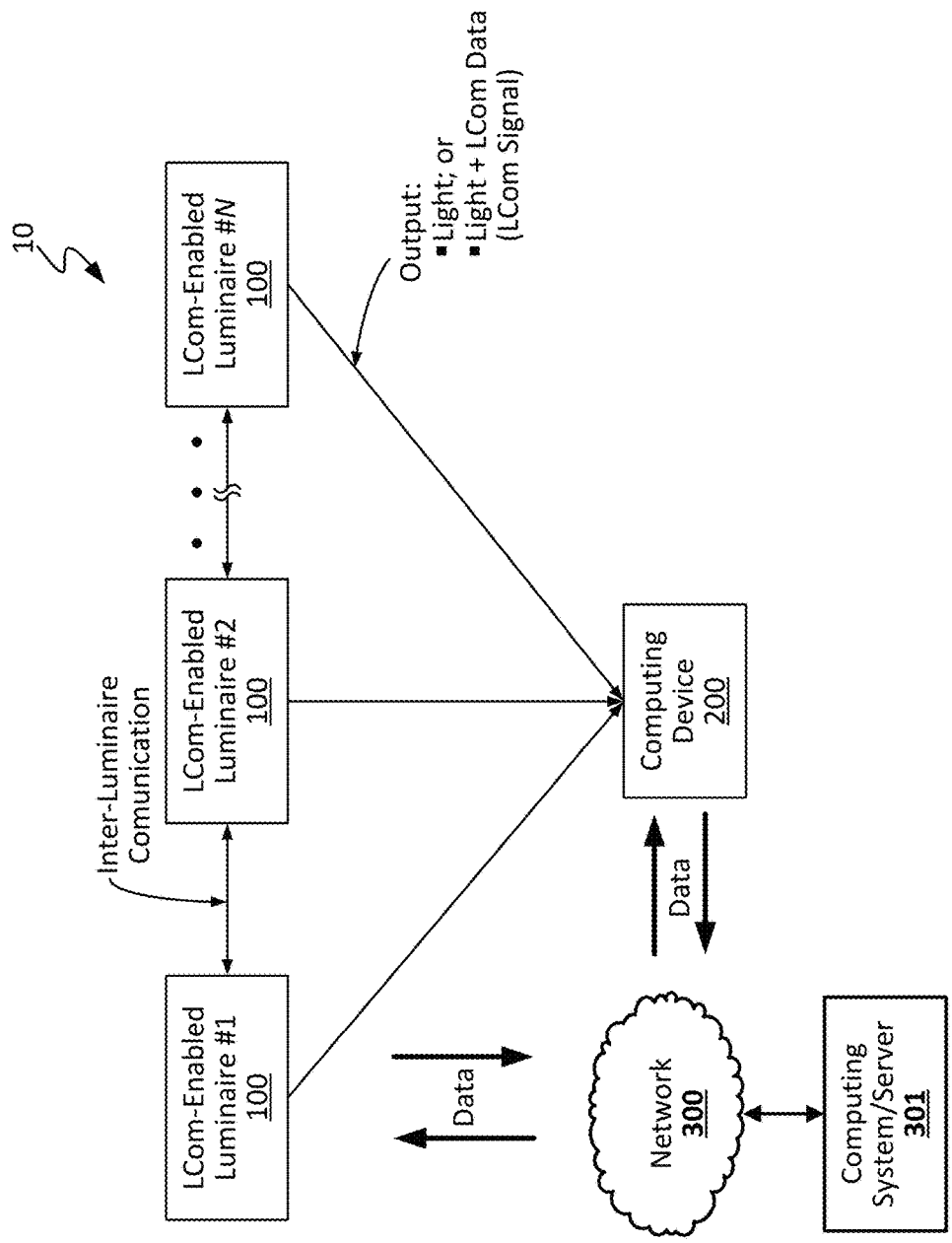
FIG. 1 is a block diagram illustrating an example light-based communication (LCom) system configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for navigating an area with multi-panel luminaires configured to display fiducial patterns. In an embodiment, a system is provided that includes a plurality of luminaires located in an area and configured to display one or more fiducial patterns recognizable by a mobile computing device. In some cases, a luminaire of the present disclosure includes a plurality of panels, each panel associated with one or more solid-state light sources (e.g., light emitting diodes (LEDs)). In other cases, a luminaire may not include a plurality of individual panels, such as in the case of a uniformly illuminated luminaire. In such cases, a physical mask can be installed or otherwise attached to the luminaire to create the appearance of individual panels. No matter their structure, the panels are configured to transmit light from the light sources in a fiducial pattern to illuminate the area and provide navigation information. The luminaire also includes at least one driver configured to control the light sources to transmit light through the plurality of panels at varying light intensities to create a fiducial pattern. As a result, the luminaire provides more light to the area as compared to light-based fiducial patterns created with a combination of illuminated and non-illuminated panels because all of the panels are transmitting light rather than only some of the panels. The plurality of panels may further include a fault indicator panel configured to indicate an error to the mobile computing device by modifying the fiducial pattern. With the error communicated to the device, users can quickly and easily navigate the area without delays caused by improperly displayed fiducial patterns. Numerous lighting applications and embodiments will be apparent in light of this disclosure.

General Overview

Light-based communication ("LCom") systems for indoor navigation provide enhanced precision and accuracy over other technologies, such as GPS or Wi-Fi. LCom systems include luminaires configured to transmit light of varying light intensities between two or more panels in the form of a fiducial pattern. A fiducial pattern is a particular configuration or arrangement of variously illuminated luminaire panels that represent information that can be decoded by a mobile computing device and optionally communicated to a user. The fiducial pattern can be detected by a mobile computing device, for example a smartphone equipped with a camera, and analyzed to produce location information.

Light-based fiducial patterns created by varying light intensities among several panels of a luminaire are more susceptible to misinterpretation by a mobile computing device than fiducial patterns created using a combination of illuminated and non-illuminated panels. This is because, in the former case, even small variations in the light intensity for a given panel can cause the entire pattern to be incorrectly displayed. That is, failure or otherwise poor performance of luminaire components (e.g., LEDs) may not only reduce an amount of light provided by a given luminaire, but also incorrectly display a fiducial pattern, thus communicating inaccurate information. Incomplete or inaccurate fiducial patterns may result from light source failures caused by age, bad contact, and overheating. Incorrect fiducial patterns may also occur in response to inherent variances in lighting equipment. For instance, light sources, such as LEDs, naturally have varying light intensities that cause a different fiducial pattern to be displayed than originally intended. In other instances, fiducial pattern errors may occur in response to light sources degrading at different rates over time and thus produce different light intensity levels than desired. No matter the cause of the fiducial pattern error, an incorrectly displayed fiducial pattern can prevent a user from navigating the area.

Other indoor navigation systems implement physical signs mounted to conspicuous surfaces, such as walls or floors, to guide persons within an area. These signs may include a fiducial sticker for communicating information that can be decoded or otherwise read by a mobile computing device. Light-based navigation systems perform better because stickers may often only be read at very short distances since the displayed patterns are relatively small. For greater distances, fiducial stickers would have to be large and thus adversely affect the aesthetic and/or function of the area. The fiducial stickers, moreover, are often poorly illuminated using indirect lighting, may be damaged and unreadable, or, when the fiducial sticker is installed on a floor, likely to be damaged or obscured by debris (e.g., dirt, mud or water). No matter its location and/or size, there are a number of external factors that can render fiducial stickers unreadable and thus, prevent a user from navigating the area.

Thus, and in accordance with an embodiment of the present disclosure, techniques and architecture are disclosed for navigating an area with multi-panel luminaires configured to display light-based fiducial patterns. The system includes a plurality of luminaires located in an area, for example a retail store or shopping mall or office building, to name a few examples. The luminaires are configured to display one or more light-based fiducial patterns recognizable by a mobile computing device. A light-based fiducial pattern is a particular configuration or arrangement of variously illuminated luminaire panels (i.e., panels of varying light intensities) that transmit information (e.g., navigation instructions) to a user of a mobile computing device. The light-based fiducial pattern can represent bits of information, such as a binary message (e.g., 01010). In such an instance, panels illuminated at a full light intensity level may represent a binary value of "1". While panels illuminated with a lower light intensity level may represent a value of "0". Thus, various combinations of illuminated panels can represent different binary messages for navigating the area. In some embodiments, the mobile computing device is configured to decode the pattern as a binary message to identify an identification number that can be used with other navigation information to determine a location within the area. Once decoded, the identification number can be used along with navigation information, such as a map and/or database content (e.g., a look-up table), stored on or otherwise accessible to the computing device to determine a specific location (e.g., aisle 3, 10 feet from end) or to identify a portion of the area (e.g., the food court of a shopping mall). In other instances, the fiducial pattern is not decoded, but rather corresponds to an identification number for a particular location within the area (e.g., pattern "A" corresponds to the food court).

The luminaire includes a plurality of panels, each panel associated with one or more solid-state light sources, for example light-emitting diodes (LEDs). The panels, in some instances, are individual physical panels, such as in the case of a multiple-panel luminaire. In other instances, such as for uniformly illuminated luminaries having a single panel or no panels, the luminaire is configured to receive a mask that defines one or more panels using a single manufactured panel. A mask is a device, for instance having a perimeter or configuration matching a single luminaire panel that is configured to change the pattern, intensity, and/or polarization of the light transmitted by a light fixture. Depending on the application, a mask may cover the entire luminaire or simply of portion thereof. In some instances, the mask may include one or more diffusers and/or optical filters, such as polarized lenses, to modify the transmission of light through the panels. No matter their structure, the panels are configured to transmit light from the light sources in a fiducial pattern to illuminate the area, as well as provide navigation information, as previously described herein. The luminaire also includes at least one driver configured to control the solid-state light sources to transmit light through the plurality of panels at varying light intensities to create the fiducial pattern.

The luminaire may include at least one fault indicator panel configured to indicate or otherwise communicate a detected error to the mobile computing device. An error may occur, for example, when a light source no longer generates light at a specified light intensity level (e.g., 95% of a maximum output), which in turn causes a different fiducial pattern to be displayed than intended or otherwise desired. In an example embodiment, errors can be detected by drivers (e.g., microcontroller or other intelligence of the driver) configured to identify changes in electrical current to one or more light sources. The electrical current, in some embodiments, is monitored continuously, while in other embodiments, changes in current flow are detected periodically. Periodic operational checks for instance, can be performed to verify luminaire operation by activating and/or deactivating the light sources of a given luminaire.

A fault indicator panel is a panel that when illuminated (or not) modifies the displayed fiducial pattern to indicate that the pattern is incorrect because of a fault within the luminaire (e.g., because of a faulty light source or panel) and thus, should be disregarded. The fault indicator panel may be located anywhere within the luminaire such that the panel can modify the fiducial pattern to indicate an error. The fault indicator panel may be a single panel or two or more panels of the luminaire. During operation of the luminaire, the fault indicator panel may be continuously illuminated to transmit light. In other embodiments, the fault indicator panel may be not be illuminated until an error is detected, at which time the panel is illuminated to communicate a fiducial pattern error. If illuminated, the light transmitted by the fault indicator panel may or may not form part of the displayed fiducial pattern, depending on the application.

In some embodiments, the system also includes a computing system in communication with the luminaires via a network and configured to detect an error with at least one light-based fiducial pattern displayed by the plurality of luminaires. In such embodiments, the luminaires may be configured to transmit information (e.g., electrical current measurements) to the computing system, which in turn analyzes the information to determine whether a fiducial pattern error exists. In other embodiments, the computing system is configured to receive a feedback input from one or more mobile computing devices. Feedback input is any communication transmitted by the mobile computing device and received by the computing system and/or the luminaire that identifies or can be used to identify an error within a displayed fiducial pattern. This feedback input may simply include an observation (e.g., receiving an indication from the fault indicator panel) that a specific luminaire is displaying an incorrect fiducial pattern. Other feedback input may specify particular panels that are not functioning, as well as an approximate location of the user.

No matter how a fiducial pattern error is detected, the system can be further configured to correct fiducial pattern errors in any one of several ways, including: (1) calibrating light sources, (2) updating map and/or database content, (3) displaying a different fiducial pattern, and (4) providing decoding instructions (e.g., scale up value for panel A by 1.2 units before decoding). These actions may be performed by the luminaire, the computing system or a combination thereof. Note, that corrective actions may involve adjusting or otherwise modifying the fiducial pattern and/or related information (i.e., maps and database content) for more than one luminaire. Other fiducial pattern correction techniques will be apparent in light of the present disclosure.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in a bi-directional fashion between a given LCom-enabled luminaire 100 and a computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaires 100 that a given computing device 200 is currently present, as well as the position information for that particular computing device 200. Such inter-luminaire communication is not needed, however, as will be appreciated in light of this disclosure.

As can be further seen in this example embodiment, system 10 allows for communicative coupling with a network 300 and one or more servers or other computer systems 301. Communicative coupling may be provided, for example, between network 300 and computing device 200 and/or one or more LCom-enabled luminaires 100, as desired. The network 300 may be a wireless local area network, a wired local network, or a combination of local wired and wireless networks, and may further include access to a wide area network such as the Internet or a campus-wide network. In short, network 300 can be any communications network.

The computer systems 301 may be any suitable computing system capable of communicating over a network 300, such as a cloud-based server computer, and may be programmed or otherwise configured to provide an LCom related service, according to some embodiments. For example, an LCom related service might be that the computer system 301 is configured to provide storage of mobile computing device position information or the position information of the luminaires 100. Numerous other such configurations will be apparent in light of this disclosure.

Figure 2B:
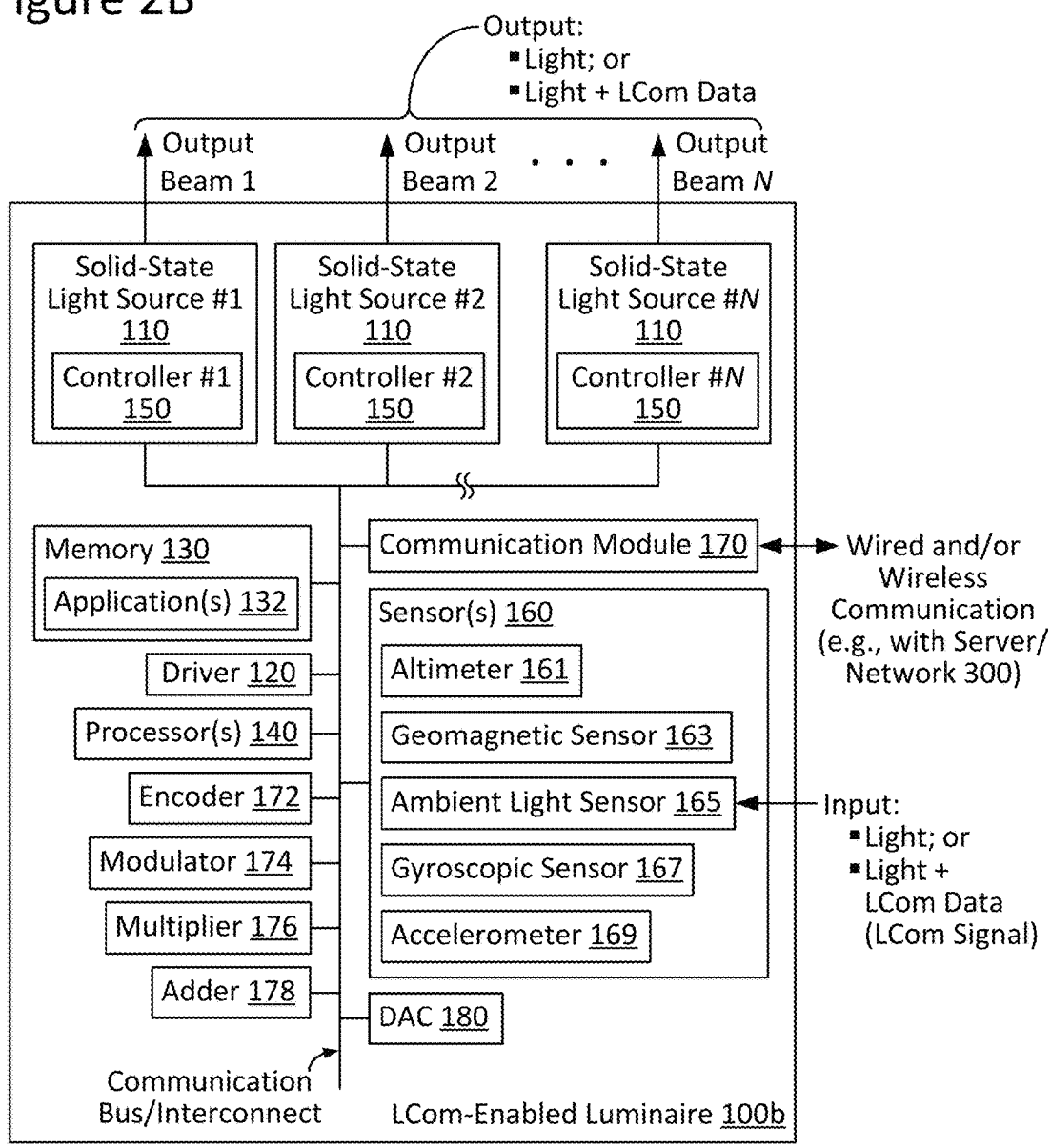
FIG. 2B is a block diagram illustrating an LCom-enabled luminaire configured in accordance with another embodiment of the present disclosure.

FIG. 2A is a block diagram illustrating an LCom-enabled luminaire 100*a* configured in accordance with an embodiment of the present disclosure. FIG. 2B is a block diagram illustrating an LCom-enabled luminaire 100*b* configured in accordance with another embodiment of the present disclosure. As can be seen, a difference between luminaire 100*a* and luminaire 100*b* is with respect to the location of controller 150. For consistency and ease of understanding of the present disclosure, LCom-enabled luminaires 100*a* and 100*b* hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s) 140 and memory 130 may be integrated within the controller 150. Numerous other configurations can be used.

Figure 3A:
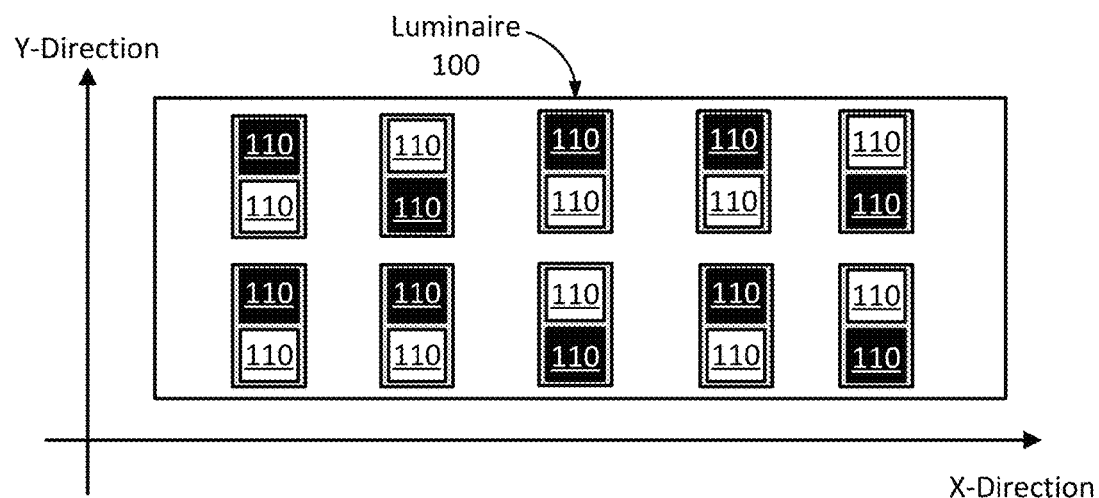
FIG. 3A illustrates an example LCom-enabled luminaire configured with light sources installed along a y-direction, in accordance with an embodiment of the present disclosure.
Figure 3B:
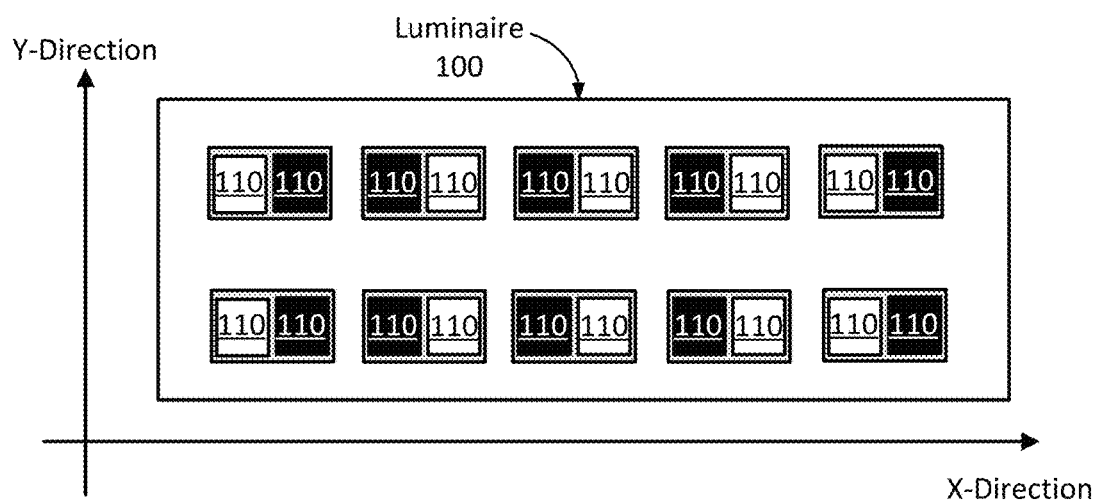
FIG. 3B illustrates an example LCom-enabled luminaire configured with light sources installed an x-direction, in accordance with another embodiment of the present disclosure.

FIG. 3A illustrates an example LCom-enabled luminaire 100 configured with light sources 110 installed along a y-direction, in accordance with an embodiment of the present disclosure. FIG. 3B illustrates an example LCom-enabled luminaire 100 configured with light sources 110 installed an x-direction, in accordance with another embodiment of the present disclosure. As can be seen, a given LCom-enabled luminaire 100 may include one or more solid-state light sources 110, in accordance with some embodiments. The quantity, density, and arrangement of light sources 110 utilized in a given LCom-enabled luminaire 100 may be customized, as desired for a given target application or end-use. This is illustrated in FIGS. 3A and 3B, in which the solid-state light sources 110 are shown in different orientations within a luminaire 100 in different decodable patterns representing different bits of information. As used herein, a bit of information (e.g., "1" or "0" in binary form) is represented by one panel of a multiple-panel luminaire that is illuminated with a particular light intensity level (e.g., 95% light intensity). In an example embodiment, the solid-state light sources 110 can be installed within the luminaire 100 in one of two different sockets. When installed in the first socket, the solid-state light sources 110 are positioned along a y-direction as shown in FIG. 3A. Installing the solid-state light sources 110 into a second socket, on the other hand, positions the solid-state light sources 110 along an x-direction, as illustrated in FIG. 3B.

Fiducial patterns are created based on the position, as well as, the light intensity of the solid-state light sources 110. As can be seen, the solid-state light sources 110 are operating at a light intensity level of 100% (as indicated by the white boxes) or not operating (as indicated by the black boxes), but in other instances the light sources 110 may be operating at light intensity levels other than 100%. The solid-state light sources 110, for example, may also be configured to operate at varying levels of light intensity (e.g., 95% and 85%) to create fiducial patterns, as described below. In other instances, the solid-state light sources 110 may not be installed into a socket, but rather on one or more continuous power rails. In such an arrangement, individual solid-state light sources 110 can be uniquely positioned in relation to surrounding solid-state light sources 110 to create various light-based fiducial patterns, including alternating or random patterns.

With respect to FIGS. 2A-2B, a given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted there through. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110 to create one or more fiducial patterns. For instance, in some embodiments, driver 120 may be configured to control the on/off state, dimming level, color of emissions, correlated color temperature (CCT), and/or color saturation of a given solid-state emitter (or grouping of emitters), such that an image capture device (e.g., a camera) can record or otherwise process a displayed fiducial pattern. In response, the mobile computing device 200 can decode the processed fiducial pattern to determine a message, as described below. To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example embodiment, the memory 130 stores position information that indicates where the luminaire is deployed (for purposes of facilitating navigation, as previously explained), and may further include a look-up table (LUT) or other memory facility that indexes baud rates by computing device type. Table 1 shows an example look-up table according to one such embodiment. Assume that each of A through F represents a transmission baud rate which can be utilized by the luminaires 100. Thus, in some cases, a given processor 140 can identify the baud rate at which a luminaire 100 should transmit based on received decoding parameters (these parameters may be provided by network 300). The decoding parameters may include high level information such as make and model of the subject computing device 200 or lower level information about that device 200 such as its sensing capability (e.g., camera imaging speed and resolution).

TABLE 1

Baud Rates LUT

| Make | Model | | | | | |
|---|---|---|---|---|---|---|
| | 5S | 6S | Galaxy S6 | Galaxy S5 | Moto X | Moto G |
| Apple Inc. | A | B | | | | |
| Samsung | | | C | D | | |
| Motorola | | | | | E | F |

The one or more applications 132 stored in memory 130 can be accessed and executed, for example, by the one or more processors 140 of a given LCom-enabled luminaire 100. In accordance with some embodiments, a given application 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 132 can be instructions encoded on any suitable non-transitory machine-readable medium that, when executed by one or more processors 140, carries out functionality of a given LCom-enabled luminaire 100, in part or in whole. In one example embodiment, at least one of these applications 132 is a routine for creating visual fiducial patterns using the solid-state light sources 110 that can be decoded or otherwise processed by a mobile computing device 200 for purposes of navigation. In any case, the luminaire 100 can broadcast a luminaire position by displaying light-based fiducial patterns to passing computing devices 200.

In accordance with some embodiments, the one or more solid-state light sources 110 of a given LCom-enabled luminaire 100 can be electronically controlled, for example, to output light, light encoded with LCom data (e.g., an LCom signal), and/or light-based fiducial patterns. To that end, a given LCom-enabled luminaire 100 may include or otherwise be communicatively coupled with one or more controllers 150. In some such example embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1-N), which may include light in the form of light-based fiducial pattern and/or LCom data, as desired for a given target application or end-use. However, the present disclosure is not so limited.

For example, in some other embodiments, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional network 300, etc.). As a result, LCom-enabled luminaire 100 may be controlled in such a manner as to output any number of output beams (1-N), which may include light in the form of light-based fiducial pattern and/or LCom data, as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110 to communicate luminaire position via a light-based fiducial pattern. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of LCom signals for transmission by a given LCom-enabled luminaire 100. In other embodiments, the control signal directs the LCom-enabled luminaire 100 to display light-based fiducial patterns. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing there through, as desired. Other suitable configurations for multiplier 176 will depend on a given application and will be apparent in light of this disclosure. In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing there through, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Note that DAC 180 may further be integrated into controller 150, in some embodiments. Other suitable configurations will be apparent in light of this disclosure.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other embodiments, or no sensors 160 may be provided, as the case may be. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be a transceiver or other network interface circuit configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as luminaire position or estimated mobile computing device position information. As explained herein, the estimated mobile computing device position information associated with the computing device 200 can be used by the luminaire to compute luminaire position. Whether the estimated mobile computing device position is computed in real time at the luminaire or received from somewhere else, the estimated mobile computing device position information can then be used to generate the LCom signals emitted by that luminaire 100 to communicate luminaire position to passing computing devices 200. Estimated mobile computing device position may also be used to identify the position of a luminaire that is displaying an incorrect fiducial pattern. The communication module 170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Beacon, integrated with or connected to the communications module 170. Other suitable configurations for communication module 170 will depend on a given application and will be apparent in light of this disclosure.

Figure 4:
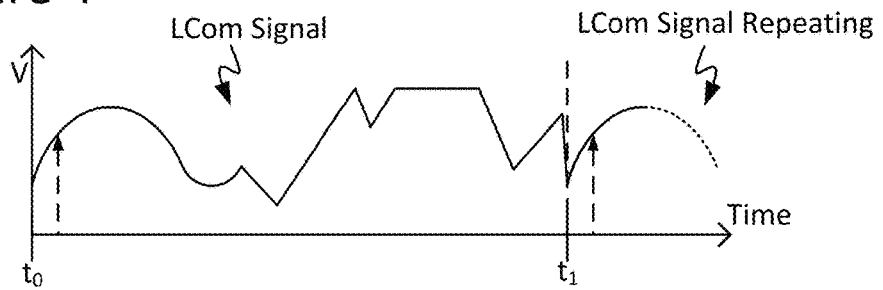
FIG. 4 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light, light in the form of light-based fiducial pattern or encoded with LCom data (e.g., an LCom signal). FIG. 4 illustrates an example arbitrary LCom signal as may be transmitted by an LCom-enabled luminaire 100, in accordance with an embodiment of the present disclosure. As can be seen here, LCom-enabled luminaire 100 may be configured to transmit a given LCom signal over a given time interval ($t_1$-$t_0$). In some cases, a given LCom-enabled luminaire 100 may be configured to repeatedly output its one or more LCom signals.

Figure 5:
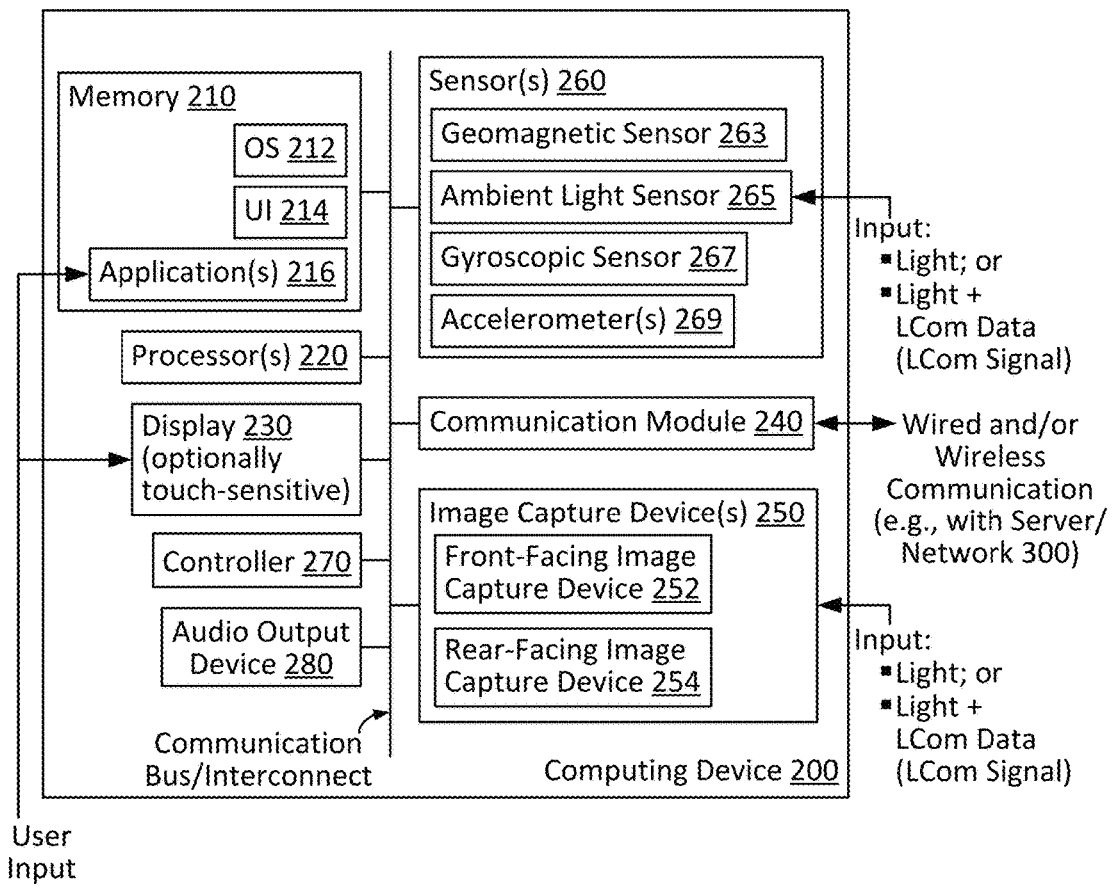
FIG. 5 illustrates an example computing device configured in accordance with an embodiment of the present disclosure.

FIG. 5 illustrates an example computing device 200 configured in accordance with an embodiment of the present disclosure. As discussed herein, computing device 200 may be configured, in accordance with some embodiments: (1) to detect the light pulses of an LCom signal and/or a displayed light-based fiducial pattern emitted by a transmitting LCom-enabled luminaire 100; (2) to decode the LCom data from a detected LCom signal and/or a displayed light-based fiducial pattern. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be further seen from FIG. 5, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis. The one or more modules stored in memory 210 (e.g., such as OS 212, UI 214, and/or one or more applications 216) can be accessed and executed, for example, by the one or more processors 220 of computing device 200. Just as explained with respect to memory 130 of the luminaires 100, memory 210 of the device 200 may include information that can be used to compute or otherwise calculate an estimated mobile computing device location and/or decode light-based fiducial patterns, as will be appreciated in light of this disclosure.

Operating System (OS) 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure. A user interface (UI) module 214 is provided as commonly done, and generally allows for user interaction with the computing device 200 (e.g., such as a graphical touched-based UI on various smartphones and tablets). Any number of user interface schemes can be used.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). In accordance with some embodiments, a given application 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 216 can be instructions encoded on any suitable non-transitory machine-readable medium that, when executed by one or more processors 220, carries out functionality of a given computing device 200, in part or in whole. In one example embodiment, at least one of these applications 216 may be a routine programmed or otherwise configured to provide decoding parameters of computing device 200 to luminaire 100, so that luminaire 100 can determine an estimated location for the computing device 200. The computing device 200 may provide the estimated computing device location to the luminaire 100, either directly via the communications module 170 including a transceiver or indirectly via a network 300 and computer system/server 301. At least one application 216 may be further configured to receive LCom signals and decode those signals. In addition, at least one application 216 may be further configured to also monitor the luminaire for any changes (orientation, with respect to computing device 200). Likewise, in some embodiments, the at least one application 216 may be further configured to optionally try to adjust its own settings to optimize decoding in effort to deal with situations where control by luminaire 100 is not available, for whatever reason.

As can be seen further from FIG. 5, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given UI action. In some cases, a touch-sensitive display 230 may facilitate user interaction with computing device 200 via the UI 214 presented by such display 230. Numerous suitable configurations for display 230 will be apparent in light of this disclosure.

In accordance with some embodiments, computing device 200 may include a communication module 240, which may be a transceiver or other network interface circuit configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 5, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital images, such as a still camera (e.g., a camera configured to capture still photographs) or a video camera (e.g., a camera configured to capture moving images including a plurality of frames). In some cases, a given image capture device 250 may include typical components such as, for instance, an optics assembly, an image sensor, and/or an image/video encoder, and may be integrated, in part or in whole, with computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Numerous other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. As a result of using these inertial sensors, the computing device 200 may provide highly accurate position information. The accuracy of this position information may result in improved navigation system operation, because the luminaire position determined using the information from the multiple data points from the inertial sensors will likely be more accurate than a luminaire position calculated using a single data point. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous sensor configurations for device 200 will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of computing device 200 will depend on a given application and will be apparent in light of this disclosure.

As can be seen further from FIG. 5, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), fourth-generation (4G), and/or fifth-generation (G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, computing device 200 may be configured for communicative coupling, for example, with a network 300 and one or more LCom-enabled luminaires 100. In some cases, computing device 200 may be configured to receive data from network 300, for example, which serves to supplement LCom data received by computing device 200 from a given LCom-enabled luminaire 100. In some instances, computing device 200 may be configured to receive data (e.g., such as known reference position information, luminaire position, luminaire identifiers, and/or other data pertaining to a given LCom-enabled luminaire 100) from network 300 that facilitates navigation via one or more LCom-enabled luminaires 100. Numerous configurations for network 300 will be apparent in light of this disclosure.

Figure 6A:
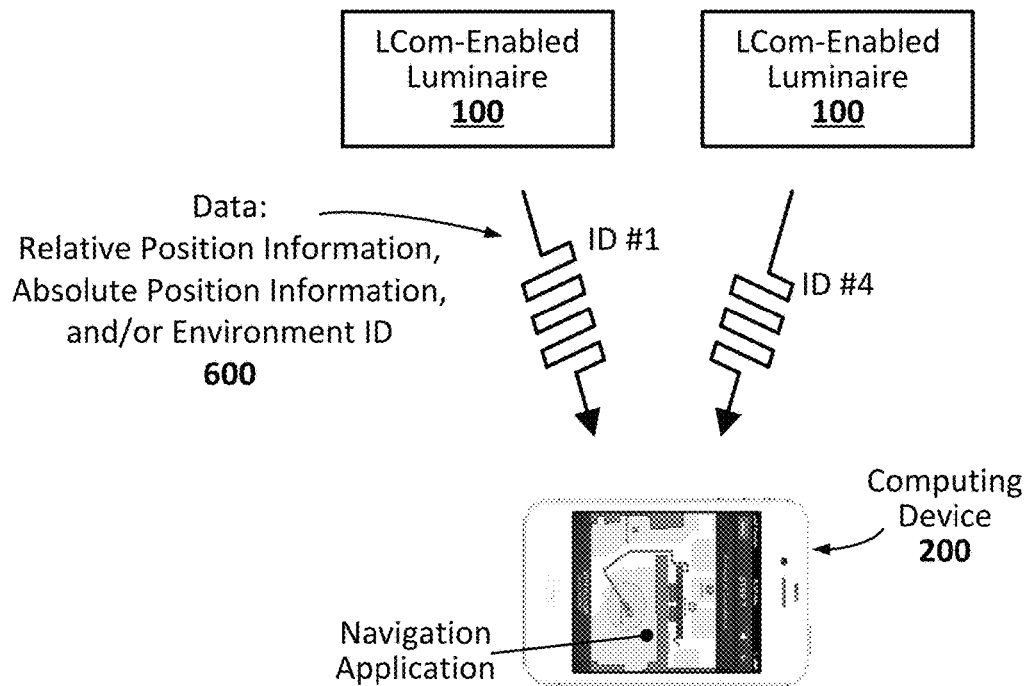
FIG. 6A illustrates an example LCom system, including an LCom-enabled luminaire and a computing device, in accordance with an embodiment of the present disclosure.

FIG. 6A illustrates an example LCom system, including an LCom-enabled luminaire and a computing device, in accordance with an embodiment of the present disclosure. As can be seen, this example scenario includes two luminaires 100 each communicating with a computing device 200, which happens to be a smartphone running an LCom-based navigation application. The navigation application can be, for instance, one of the applications 216 stored in memory 210 and executed by processor(s) 220. As can be further seen, the LCom signals being communicated include data 600, which generally includes position information, which may be used to navigate. For instance, if the user is receiving light from a specific luminaire 100 that has a known location, then the navigation application 'knows' where the user is and can continue to guide the user along the targeted path.

The position information 600 transmitted by the luminaires 100 may come in any number of forms. For instance, in some embodiments, the luminaire positions may be communicated as a relative position (e.g., relative to another luminaire 100, or some other object having a known position), and/or as an absolute position (e.g., x-y coordinates of a grid-based map). In still other embodiments, the luminaire position may be communicated as an environment ID, in which the transmitted ID translates to a specific location on a given map of the environment being navigated. In some such example cases, for instance, a luminaire might use dual tone multi frequency (DTMF) encoding, which means it continuously sends two unique frequencies. In some embodiments, the luminaire position may be communicated via a fiducial pattern as described herein.

Figure 6B:
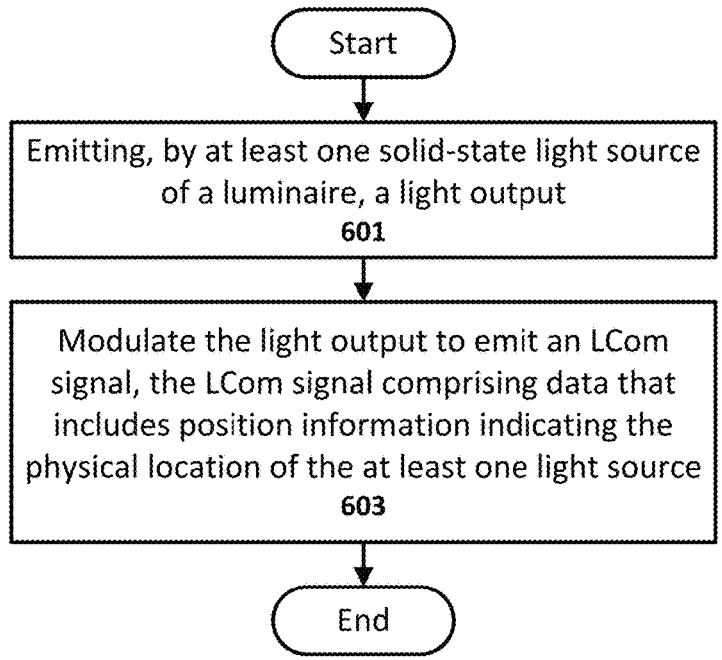
FIG. 6B illustrates an example method for emitting position information from an LCom-enabled luminaire, in accordance with an embodiment of the present disclosure.
Figure 6C:
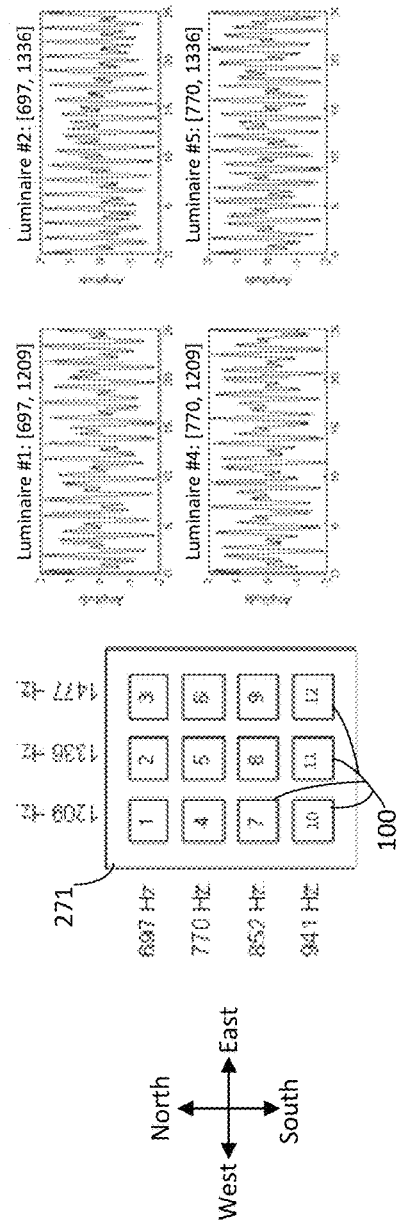
FIG. 6C illustrates an example graphical map of LCom-enabled luminaires deployed in a given venue, and corresponding LCom transmissions indicating the location of that particular luminaire within the venue, in accordance with an embodiment of the present disclosure.

FIG. 6C shows how an example DTMF-based ID system might work. As can be seen, a given environment 271 is the area being navigated and has a number of LCom-enabled luminaires 101. The environment 271 may be, for example, a super market or retail store, or a shopping mall, or a parking garage, or a large office space, to name a few examples. The environment 271 is effectively divided into a grid of physical locations, each location being associated with at least one luminaire 100. As can be further seen, each luminaire 100 is associated with two unique frequencies that it can transmit on a regular basis. The two unique frequencies can thus be used to correlate that particular luminaire's position to a specific location within the environment. For instance, if the user is receiving light from luminaire #1 (which transmits 697 Hz and 1209 Hz in this example embodiment), then the navigation application 'knows' that the user is in the North-West corner of the environment 271; similarly, if the user is receiving light from luminaire #12 (which transmits 941 Hz and 1477 Hz in this example embodiment), then the navigation application 'knows' that the user is in the South-East corner of the environment; and so on. So, in one example scenario, assuming that environment 271 is a store selling goods of some kind, each location can be associated with a specific product or range of products. Thus, a user can be led to a given product location by the navigation application, according to some embodiments. Note that the entire frequency-based grid can be scaled to higher or lower frequencies and still operate as described here to uniquely identify the location of individual luminaires 100.

FIG. 6B illustrates an example method for emitting position information from an LCom-enabled luminaire, in accordance with an embodiment of the present disclosure. As can be seen, the method includes emitting 601, by at least one solid-state light source of a luminaire, a light output. The method further includes modulating 603 the light output to emit an LCom signal, the LCom signal including data that includes position information indicating the physical location of the at least one light source. According to some embodiments, this position information may indicate that particular luminaire's location directly by virtue of relative or absolute position information, as previously explained. In other embodiments, this position information may indicate that particular luminaire's location indirectly by virtue of an environment ID that translates to a specific location on a given map of the environment being navigated. Numerous other embodiments and variations using luminaires having known locations within a given area to be navigated will be apparent in light of this disclosure.

Figure 6D:
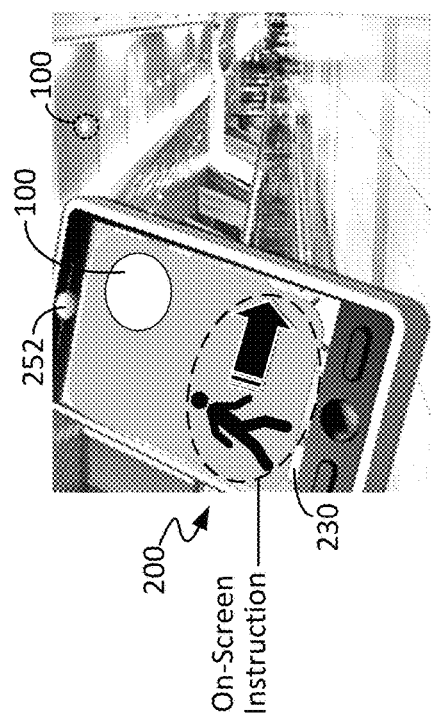
FIG. 6D illustrates an example scenario in which a computing device is configured to provide an instruction by way of visual feedback to a user, in accordance with an embodiment of the present disclosure.

FIG. 6D illustrates an example scenario in which a computing device 200 receiving LCom signals from luminaries 100 and is configured to output a navigational instruction by way of visual feedback to a user, in accordance with an embodiment of the present disclosure. Note how the actual luminaire 100 in the physical space being navigated is being imaged by way of camera 252, and the resulting image of that luminaire 100 is provided on the display 230 of the device 200. Based on receiving LCom signals from that luminaire 100 (which indicate the position of that luminaire 100), the navigation application continues to guide the user with a visual cue (an arrow in this example case). As the user progresses down the passageway, each subsequent luminaire 100 that is similarly imaged and processed by the device 200 allows the navigational guidance to continue, until the user arrives at the luminaire associated with the user's intended destination.

Figure 7A:
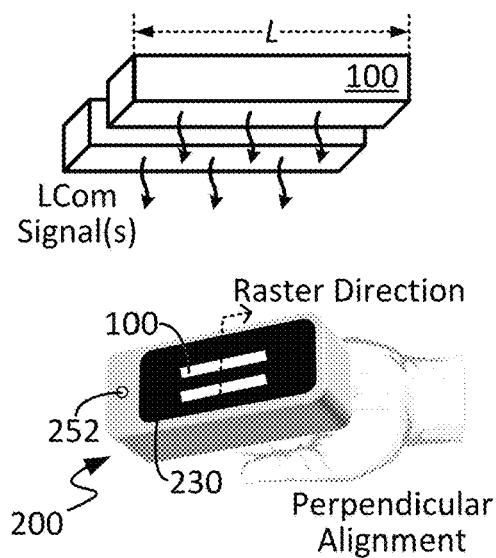
FIGS. 7A and 7B each illustrate example orientations between luminaires and a computing device, and how that affects the ability of the device raster lines to decode LCom messages from the luminaires.
Figure 7B:
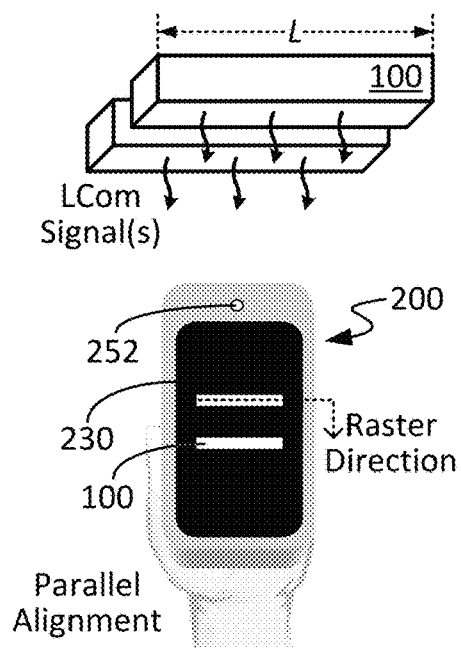

FIGS. 7A and 7B show a user holding the computing device 200 in two different orientations. The computing device 200 in this example is a smartphone, but can be any other suitable computing device as well. As can be seen, the computing device 200 includes a front-facing image capture device 252 that is currently imaging the above-luminaires 100, and the resulting image is shown on display 230. Two luminaires are being imaged, as can be further seen. In FIG. 7A, the user is holding the computing device 200 where the luminaires 100 are perpendicular to the raster lines (and therefore parallel to the raster direction). For this case, the luminaires 100 being imaged spans the maximum number of raster lines. Assume, for example, camera frame having 750 raster lines perpendicular to the raster direction. Thus, a luminaire imaged with the device 200 in that orientation will span the maximum a relatively large number of raster lines (e.g., 350 raster lines or more). However, in the example of FIG. 7B, the luminaires 100 are parallel to the raster lines (and therefore perpendicular to the raster direction). Consequently, each imaged luminaire 100 effectively spans a fraction of the raster lines, or otherwise fewer raster lines relative to when the device 200 is in the opposite orientation shown in FIG. 7A. While in some cases the user can be directed to orient the device 200 to be more like the orientation shown in FIG. 7A (to improve the ability of device 200 to receive and process LCom messages from luminaires 100), other embodiments can solve this rastering problem through a variable baud rate which has the advantage of not requiring any effort/manual intervention with the user of the device 200.

Example Multi-Panel Luminaire Application

Figure 8A:
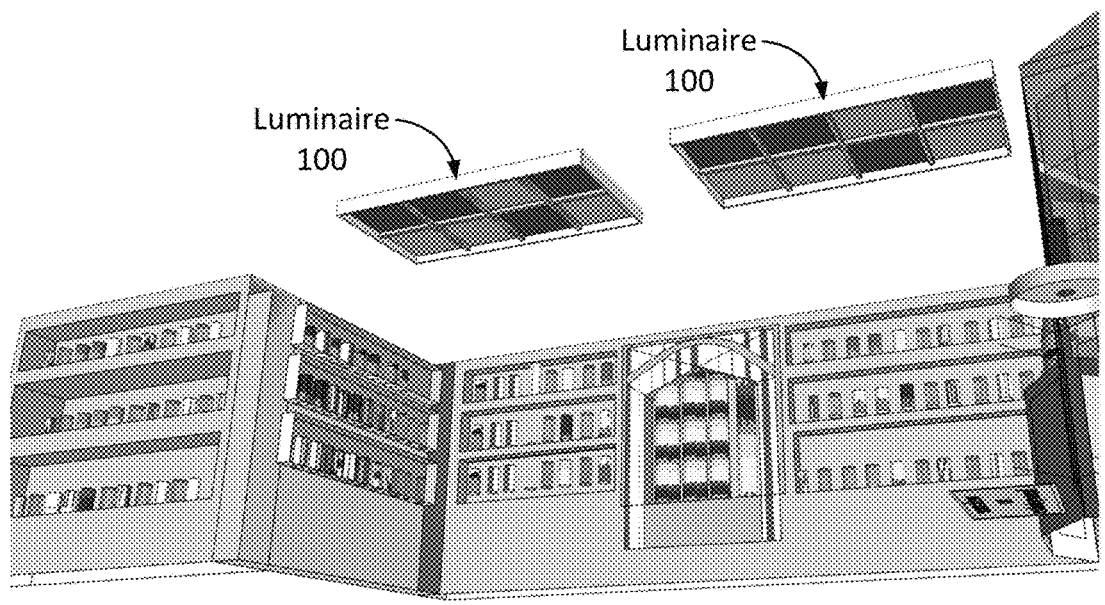
FIG. 8A illustrates an area including example multi-panel luminaires, in accordance with an embodiment of the present disclosure.
Figure 8B:
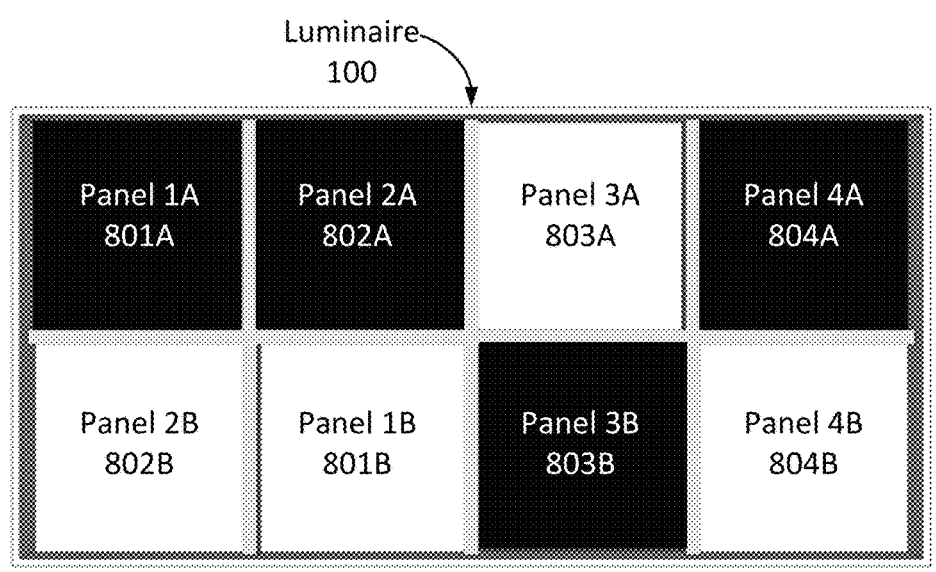
FIG. 8B illustrates a bottom view of an example multi-panel luminaire configured to display fiducial patterns using illuminated and non-illuminate panels, in accordance with an embodiment of the present disclosure.

FIG. 8A illustrates an area (e.g., a store) including example multi-panel LCom-enabled luminaires 100, in accordance with an embodiment of the present disclosure. FIG. 8B illustrates a bottom view of an example multi-panel luminaire configured to display fiducial patterns using activated and non-activated light sources, in accordance with an embodiment of the present disclosure. As can be seen in this example embodiment, multi-panel LCom-enabled luminaire 100, hereinafter referred to as luminaire 100, includes eight panels—1A (801A), 1B (801B), 2A (802A), 2B (802B), 3A (803A), 3B (803B), 4A (804A), 4B (804B). The panels will primarily be referred to by their panel number (e.g., 1A, 1B, etc.) for ease of description. The luminaires 100 described herein may have any suitable configuration. For example, the luminaire 100 may be laid out in a rectangular grid having rows and columns, such as shown in FIG. 8B. In another example, the luminaire 100 may be laid out in a circular arrangement, in which the individual panels making up the luminaire are shaped like a triangular segment of a circle. Further, the panels of a luminaire 100 as variously described herein may be any number or grouped configuration of at least one solid-state light source, hereinafter referred to as light sources. Therefore, the panels may have any shape and size, and are not limited to any particular design or configuration, unless otherwise indicated.

Luminaire 100 is configured to display a light-based fiducial pattern by controlling one or more light sources (e.g., light sources 110 of FIGS. 3A and 3B) associated with each panel of the luminaire 100. In such an embodiment, the luminaire 100 includes a driver, such as described herein, configured to control the operation of light sources (e.g., one or more LEDs) to create a light-based fiducial pattern, hereinafter referred to as a fiducial pattern. A fiducial pattern is a particular configuration or arrangement of variously illuminated luminaire panels that represent information that can be decoded by a mobile computing device and optionally communicated to a user. The fiducial pattern is illustrated in FIG. 8B, in which the light sources for panels 1A, 2A, 3B and 4A are off (as indicated by the black colored boxes), while the light sources for panels 2B, 1B, 3A, and 4B are on (as indicated by the white colored boxes). In example embodiment, the fiducial pattern is continuously transmitted by the luminaire when the light sources are operating, but not in all cases. The fiducial pattern, in other cases, can be transmitted intermittently or otherwise non-continuously (e.g., periodically) by the luminaire, as described further herein. When the luminaire is within a FOV of a mobile computing device, the computing device may record or otherwise process an image of the displayed fiducial pattern using sensor technology (e.g., CMOS), as described herein and in U.S. patent application Ser. No. 14/575,493, titled "Multiple Panel Luminaires For Light-Based Communication," filed on Dec. 18, 2014 and herein incorporated by reference in its entirety.

As previously described, each individual panel of the luminaire 100 represents one bit of information (e.g., "1" or "0" in binary form). Thus, a multiple-panel luminaire can communicate several bits of information by selectively illuminating its panels. Collectively, several illuminated panels can communicate several bits of information (e.g., 0101110) in the form of a fiducial pattern that can be decoded by mobile computing devices to retrieve navigation information (e.g., an identification number). With the image of the fiducial pattern processed, the mobile computing device may decode navigation information provided by the pattern. In an example embodiment, the computing device is configured to assign a binary value of zero for panels that are turned off (e.g., 1A, 2A, 3B and 4A) and a binary value of one for panels that are turned on (e.g., 2B, 1B, 3A, and 4B). Using a decoding algorithm or a panel sequence (e.g., decode panel #1A then panel #1B then panel #2A and so on), the information (e.g., 0 or 1) associated with each panel can be decoded to provide a binary message. The binary message, in the example embodiment, is an luminaire identifier, such as an identification number (e.g., ID #45). Using a navigation map and/or database content (e.g., a look-up table), the mobile computing device is configured to correlate the decoded luminaire identifier with a specific location within the area.

Figure 8C:
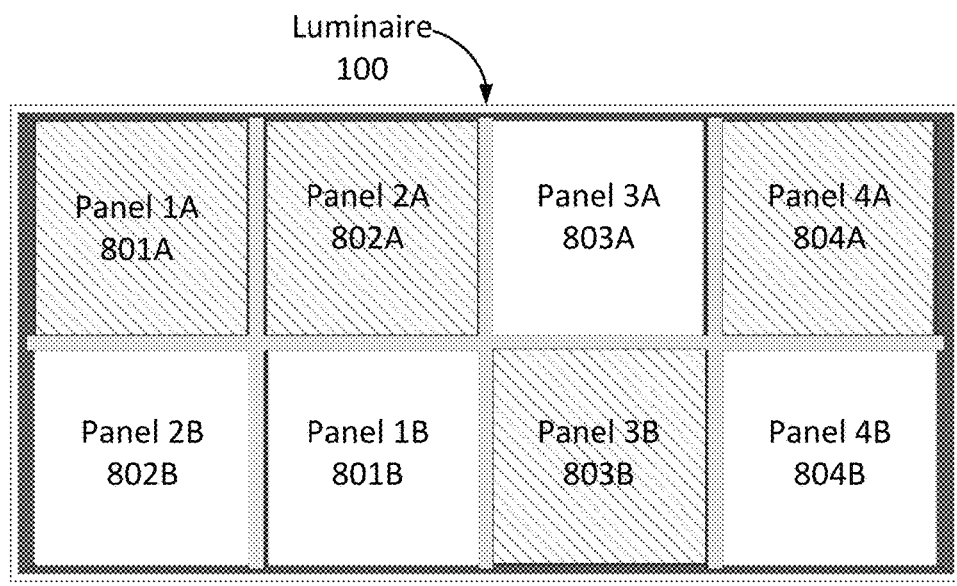
FIG. 8C illustrates a bottom view of an example multi-panel luminaire configured to display fiducial patterns using panels of varying light intensity levels, in accordance with an embodiment of the present disclosure.

FIG. 8C illustrates a bottom view of an example multi-panel luminaire 100 configured to display fiducial patterns using panels 801A, 801B, 802A, and 802B of varying light intensity levels, in accordance with an embodiment of the present disclosure. Creating a fiducial pattern by switching on and off light sources reduces the light output of the luminaire 100. In the above example embodiment, the luminaire 100 is producing approximately half of the amount of light that the fixture is capable of producing because some of the light sources are turned off to create the fiducial pattern. As a result, the luminaire 100 is not providing a maximum amount of illumination to the area. To remedy this deficiency, the luminaire can be configured to non-continuously or otherwise periodically transmit the fiducial pattern. In an example embodiment, the luminaire 100 is configured with two operational modes: (1) full luminescence and (2) message. When operating in full luminescence mode, the luminaire 100 is configured to provide a maximum amount of light within the FOV of the luminaire 100. A maximum amount of light may be defined in terms of physical component capability (e.g., maximum output of a LED) or programmatic limits imposed by system operating software. No matter how the maximum amount of light is defined, the full luminescence mode provides a sufficient amount of light to enable users of mobile computing devices to navigate the area below and about the luminaire 100.

During message mode, however, the luminaire 100 creates a fiducial pattern which generally results in transmitting less light to the area, given that one or more panels are in an off state or transmitting at a lower than maximum light intensity. In more detail, the fiducial pattern, in this example embodiment, is created by varying the light intensity levels for one or more panels (e.g., 1A, 1B, 2A and so on) of the luminaire 100 using a driver, as previously described herein. This is shown in FIG. 8C, in which a fiducial pattern is illustrated by panels 1A, 2A, 3B and 4A having a lower light intensity (as indicated by the shaded boxes) than panels 1B, 2B, 3A and 4B having a maximum light intensity (as indicated by the non-shaded boxes). As can be seen, none of the panels have light sources that are off, as previously illustrated in FIG. 8B. Rather, all the panels are transmitting light, but at different light intensity levels. The different light intensity levels create a fiducial pattern that is detectable by passing mobile computing devices. Lower light intensity levels may be, but are not limited to 98%, 97%, 95%, 92%, 85%, and so on, of the full light intensity level for a panel. In a more general sense, note that the lower light intensity level panels can be at any lower level, such that a fiducial pattern is detectable by a mobile computing device. To achieve a maximum output of light for the luminaire 100, however, the panels having lower light intensity levels (e.g., 1A, 2A, 3B and 4A) are to transmit light at intensity levels as close as possible to a full light intensity level while yet still creating a detectable or otherwise recognizable fiducial pattern. In some embodiments, transitioning luminaire operation from full luminescence mode to message mode can represent a "1" bit, in Manchester encoding. Changing luminaire operation from message mode to full luminescence mode, on the other hand, represents a "0" bit. Thus, the luminaire is configured to transmit navigation information to a mobile computing device using a light-based fiducial pattern (mode 1) along with visible light communication techniques (mode 2) previously described herein. So, in mode 1, fiducial-based light communication as variously explained herein can be carried out (in which light-based messages are created based on the number of light elements that are on and/or the intensity of one or more light elements, and can be sensed by a light sensor such as camera and may or may not be human perceptible). In mode 2, visible light communication as variously explained herein can be carried out (in which light-based messages are encoded in the light output by modulating the full-intensity light output at a frequency that is not perceptible by the human eye, but can be sensed by a light sensor such as a camera). Both modes may be available, in some embodiments.

No matter how the fiducial pattern is created, the pattern may be displayed at any time during an operating period. In an example embodiment, the operating period is 600 milliseconds. Within this period, the luminaire 100, in some embodiments, is configured to display a fiducial pattern for approximately 20 milliseconds. During the remaining portion of this period (i.e., 480 milliseconds), the luminaire 100 is configured to operate the light sources at a full light intensity level. In other embodiments, the operating period and/or the time for displaying the fiducial pattern may be longer or shorter depending on a particular application.

Once displayed, the fiducial pattern can be decoded by a computing device configured to receive images by, for example, associating lower light intensity panels with "0" and higher light intensity panels with "1". This information can be used to decode the image of the fiducial pattern and thus, retrieve navigation information for determining a location within the area. In an example embodiment, the image of the fiducial pattern is decoded by passing mobile computing devices to determine a luminaire identifier, such as an identification number. A luminaire identifier can be a number, letter, word, and/or symbol that when combined with supplemental information (e.g., a map or look-up table) can be used to determine a particular location within the area, for example a location of a luminaire within a large building. In such an embodiment, the mobile computing device is configured to retrieve a map of the area that identifies the location of each luminaire using an assigned luminaire identifier. A map, in some embodiments, is a virtual representation of an area for determining a location of a user based on a luminaire identifier decoded from the received image of the fiducial pattern. In this instance, the map may list and/or visually display a number of luminaires by luminaire identifier within the area. Using the decoded luminaire identifier, the mobile computing device can determine a location within the area using luminaire identifier entries, look-up tables and/or other supplemental information. In other instances, the decoded fiducial pattern information can be used to determine a particular location rather than a luminaire, such as the food court, main entrance, elevator entrance or a retail store. In such an instance, supplemental data, such as look-up tables, are configured to associate or correlate a luminaire identifier with a location within the area rather than a luminaire. No matter how the location is determined, the mobile computing device may be further configured to provide instructions, such as step-by-step instructions, to the user for navigating the area.

The luminaire 100, in some embodiments, is configured to modulate the displayed fiducial pattern to communicate information via LCom signals, such as a visible light communication (VLC) signal. The VLC signal transmits additional and/or other information (e.g., supplemental navigation, emergency or retail information) different from the navigation information transmitted by the fiducial pattern. In an example embodiment, the luminaire is configured to operate the light sources of the luminaire 100 (e.g., using a driver to control the light sources) to display the fiducial pattern with a first light intensity (e.g., a light intensity level of 100% for the light sources of the luminaire) to communicate navigation information via the fiducial pattern, as previously described herein. The luminaire 100 is further configured to operate the light sources to display the fiducial pattern with a second light intensity (e.g., a light intensity level of 95% for the light sources) different from the first light intensity to create a VLC signal. Modulating the fiducial pattern to create a VLC signal can be carried out using LCom signal techniques, previously described herein. In a more general sense, the light intensity for the displayed fiducial pattern can be modulated using the light sources of the luminaire 100 to transmit information via VLC signals to a mobile computing device. The information communicated by the VLC signals is in addition to and/or otherwise supplements the navigation information transmitted to the mobile computing device with the fiducial pattern displayed by the luminaire 100.

Techniques for Fiducial Pattern Error Detection

There are many challenges related to displaying light-based fiducial patterns for navigating an area. Physical fiducial patterns have the problems mentioned above, such as the pattern being rendered unreadable due to external factors, such as poor illumination and physical damage. Light-based fiducial patterns can also experience problems caused by factors, such as failure or degradation of luminaire components (e.g., drivers and light sources) over time. These failures may cause fiducial pattern errors that prevent a user from navigating the area. Fiducial patterns errors, such as incomplete or duplicate patterns, can render the received image of the fiducial pattern unreadable and/or unusable for navigation. Embodiments described below are configured to detect and correct these errors to ensure usability and accuracy of the system. As will apparent in light of this disclosure, these corrections can be made without replacing physical system components and thus, without incurring costs and delays associated therewith.

Figure 8D:
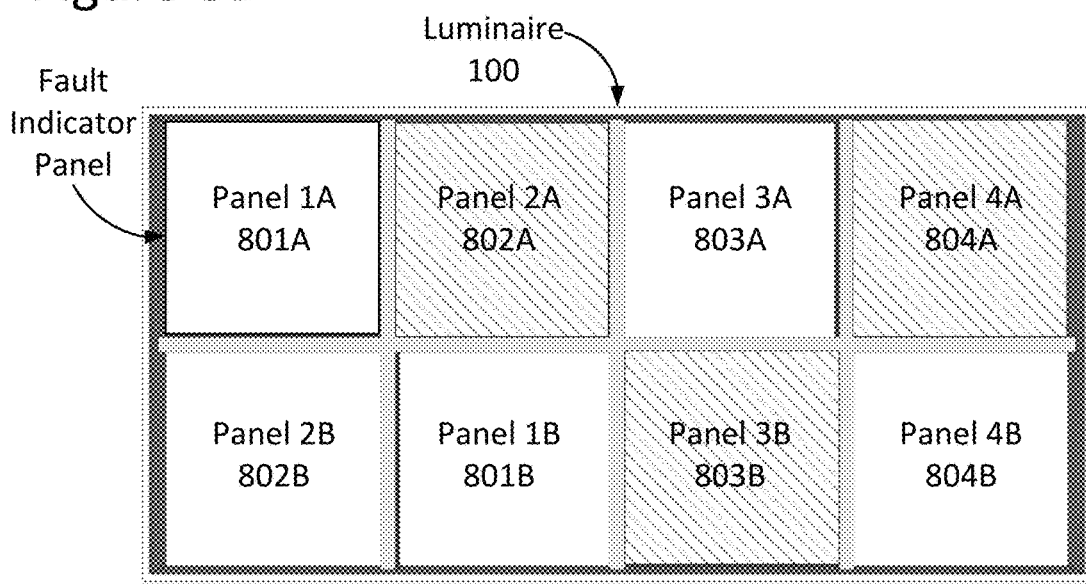
FIG. 8D illustrates a bottom view of an example multi-panel luminaire with a fault indicator panel that is illuminated to indicate no fiducial pattern errors, in accordance with an embodiment of the present disclosure.
Figure 8E:
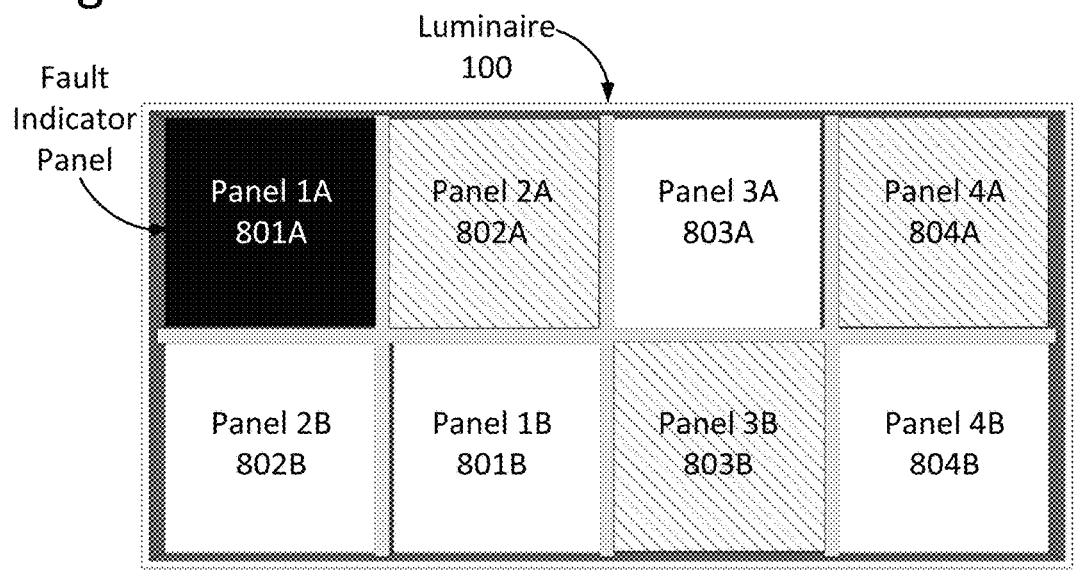
FIG. 8E illustrates a bottom view of an example multi-panel luminaire including a fault indicator panel that is not illuminated to indicate a fiducial pattern error, in accordance with an embodiment of the present disclosure.

FIG. 8D illustrates a bottom view of an example multi-panel luminaire 100 with a fault indicator panel 801A that is illuminated to indicate no fiducial pattern errors, in accordance with an embodiment of the present disclosure. FIG. 8E illustrates a bottom view of an example multi-panel luminaire 100 including a fault indicator panel 801A that is not illuminated to indicate a fiducial pattern error, in accordance with an embodiment of the present disclosure. In another example embodiment, the luminaire 100 is configured to detect an incorrect fiducial pattern by monitoring the electrical current between the driver 120 and the light sources 110 to identify changes in the flow of electrical current.

The current may be monitored continuously or periodically. For instance, in some embodiments, the function of a luminaire 100 is verified or otherwise checked upon luminaire activation. In such an instance, the driver 120 is configured to turn on all the light sources 110 of the luminaire 100. While the light sources 110 are turning on or otherwise powering up, the driver 120 is also configured to monitor the electrical current to each light source 110 to determine errors based on identified changes in electrical current. Changes in current, such as those ranging between 10 milliamps to 500 milliamps may indicate a fiducial pattern error, in some embodiments. In some instances, once activated the luminaire performs periodic (e.g., once a week, month, or every three months) operational checks to verify proper system function during use. An operational check, in some embodiments, may include deactivating and reactivating to the light sources to determine changes in current flow to the light sources. In some such instances, the driver 120 is configured to monitor changes in electrical current of each light source 110 while the luminaire 100 is powering down to a deactivated state, as well as, powering up to an activated state. A processor in the luminaire 100 may compare the detected electrical current to stored electrical currents (e.g., stored in memory) that represent proper functioning of each of the light sources 110. If the detected current of a particular light source 110 deviates from the stored current by at least a threshold, then that may indicate that a particular light source 110 is faulty. These functional periodic verifications may be accomplished as one or more groups or sub-groups of luminaires or on an individual luminaire basis depending on the system application and/or configuration.

Once detected, the identified error is communicated to the mobile computing devices in one of several ways. One way, for example, is to configure the luminaire 100 with a fault indicator panel. A fault indicator panel is a panel that when illuminated or not illuminated indicates that the displayed fiducial pattern is incorrect and thus, should be disregarded. The fault indicator panel, for instance, can be one or more panels associated with one or more light sources of the luminaire 100. In more detail, the fault indicator panel may be normally illuminated or not depending on the application. For instance, when the fault indicator panel is normally not illuminated, a correctly displayed fiducial pattern (i.e., a pattern without errors) is identified by the fault indicator panel not being illuminated. In such instance, the fiducial pattern, for purposes of providing navigation information, may not include the fault indicator panel, such that the fault indicator panel is independent of the pattern. Upon detecting an error, the fault indicator panel is illuminated and thus, indicates to passing mobile computing devices that the fiducial pattern is incorrect and should be ignored.

In other embodiments, however, the fault indicator panel may be continuously illuminated when no errors are detected. In such a configuration, the luminaire can communicate fiducial pattern errors despite a failure with the fault indicator panel and/or its associated light source because a non-illuminated fault indicator panel indicates an error. In more detail, the fault indicator panel may form part of the fiducial pattern. As can be seen in FIG. 8D, panel 1A is the fault indicator panel and forms part of the fiducial pattern. With panel 1A illuminated (as indicated by the white colored box in FIG. 8D) the fiducial pattern is complete and luminaire indicates no errors with the fiducial pattern. Once an error is detected, as previously described, the fault indicator panel is no longer illuminated, as illustrated in FIG. 8E (as indicated by the black colored box). As a result, the fiducial pattern is incomplete and the fiducial pattern error is recognizable. In contrast, when the fault indicator panel is normally not illuminated during operation (i.e., no errors present), a failure of the fault indicator panel and/or its associated light source prevents the luminaire from communicating fiducial pattern errors because fault indicator panel cannot be illuminated to communicate the error. In such embodiments, where the fault indicator panel is not part of the fiducial pattern, the pattern is still displayed properly and there is no immediate problem. If, however, the luminaire experiences subsequent component failures that cause further errors with the fiducial pattern, the presence of these additional errors cannot be communicated to system users.

Another way to communicate an error to mobile computing device users may include intermittently illuminating one or more panels of the luminaire, such that a user or a computing device can visually see or detect a flashing light. In such an instance, the luminaire is configured to no longer modulate between full luminescence mode and message mode, but rather operate in an error mode. When operated in error mode, the luminaire is configured to intermittently operate the remaining functioning light sources causing their associated panels to appear flashing as lights that are recognizable to the human eye. In such embodiments, one, two or all the functioning panels may appear flashing. Upon seeing the flashing luminaire panel(s), the user knows to disregard the luminaire for purposes of navigation. Numerous other embodiments will be apparent in light of this disclosure.

In other embodiments, the mobile computing device, as well as the luminaire 100, is configured to detect an error with the fiducial pattern. The computing device may include hardware and software, such as light sensors and software applications for receiving and decoding the information associated with the displayed fiducial pattern. The computing device can determine an error with the fiducial pattern based on: (1) an incorrect fiducial pattern (e.g., pattern "B" is displayed instead of pattern "A") and/or (2) recognizing an error indication (e.g., indication by fault indicator panel).

The mobile computing device, in some embodiments, is configured to detect a fiducial pattern error by comparing the information decoded from the fiducial pattern with a map and/or content of database stored on or otherwise accessible (e.g., via network) to the computing device. As previously described above, the fiducial pattern can be decoded into navigation information (e.g., identification number) that when combined with stored information (e.g., a map and/or database content, such as a look-up table) can be used to determine a location within the area. Once identified, the determined location can be compared with information (e.g., a map or database content) stored on the mobile computing device and/or a remote computing system (e.g., a server) to verify the accuracy of the determined location. In an example embodiment, the mobile computing device may log previous decoded identification numbers. Using this information, the device can predict the next luminaire that the user is likely to pass and thus, a predicted next location. The determined location can be compared with the predicted location to verify the accuracy of the determined location. If the predicted and determined locations do not match or otherwise correlate to one another (e.g., outside a given tolerance range), then the device is configured to determine that the information decoded from fiducial pattern is incorrect. In other instances, the user may manually enter one or more locations within the area that correspond to a known location on the map to provide a reference point for verifying a determined location rather using a predicted location based on past user movements.

Mobile computing devices may also be configured to recognize an error indication in a fiducial pattern to prevent receiving improper navigation information. In an example embodiment, the mobile computing device is configured to identify fiducial pattern errors in response to recording a fiducial pattern image that includes a fault indication. In more detail, the computing device is programmed or otherwise configured to perform routines and/or sub-routines to analyze the fiducial pattern image to identify the presence of a fault indication (e.g., fault indicator panel illuminated or not, depending on the application). Algorithms, such as cyclic redundancy check error-detecting code, can be used to detect changes in data, for example the presence of a fault indication in a fiducial pattern image. Using data analysis techniques, the presence of a fault indication is identified by comparing the recorded fiducial pattern image with one or more stored fiducial patterns corresponding to the navigation data. If the recorded fiducial pattern does not match one of the fiducial patterns used for navigation then the system determines the received fiducial pattern contains an error and thus can be disregarded for purposes of navigating the area.

In other embodiments, the system also includes a computing system in communication with the luminaires via a network and configured to detect an error with at least one light-based fiducial pattern displayed by the plurality of luminaires. In such embodiments, the luminaire can be configured to transmit information (e.g., electrical current measurements) to the computing system, which in turn analyzes the information to determine whether a fiducial pattern error exists. In other embodiments, the computing system is configured to receive a feedback input from one or more mobile computing devices. Feedback input is any communication transmitted by the mobile computing device and received by the computing system and/or a luminaire that identifies or can be used to identify an error with a displayed fiducial pattern. This feedback input may simply include an observation (e.g., receiving an indication from the fault indicator panel) that a specific luminaire is displaying an incorrect fiducial pattern. Other feedback inputs, for example, may specify particular panels that are not functioning, as well as, an approximate location of the user.

Once an error is detected and users made aware of the error, the system is configured to make adjustments to correct the error. Adjustments may be made in one of several ways. One way, for example, includes configuring the luminaire 100 to receive instructions to calibrate one or more light sources disposed therein. In such an instance, the fiducial pattern error can be corrected without changing the pattern itself, but rather by adjusting how the pattern is displayed. In more detail, luminaires 100 configured to create fiducial patterns with varying light intensity levels (e.g., 100% and 90%), may be calibrated or otherwise adjusted to correct the light intensity levels for individual light sources to achieve a desired fiducial pattern. Using system software and/or feedback from one or more mobile computing devices, the luminaire 100 is configured to calibrate the light sources, such that the sources operate at the same light intensity level for a given mode of operation (i.e., full luminescence or message modes). Luminaires 100 may scale up or down the gain for the out-of-specification light sources to correct the displayed fiducial pattern. These adjustments may be generated by the luminaire itself or externally using instructions from a computing system or mobile computing device. If externally generated, these instructions may simply indicate a particular luminaire panel (e.g., panel 1A) as being incorrectly illuminated and the luminaire 100 and/or computing system may determine the level of adjustment. In other instances, the instructions may specify a particular gain or loss at which to adjust the light sources. In response to such instructions, the luminaire 100 may be configured to adjust downward light sources having the correct light intensity level (e.g., less gain applied) to achieve the desired fiducial pattern, but not always. Lower intensity light sources may also be adjusted or otherwise scaled up to approximately match the light intensity level for the properly functioning light sources.

In some other embodiments, the fiducial pattern error is corrected by adjusting information associated with the fiducial pattern (i.e., a map and/or database content), rather than the pattern itself. This information may be store in the luminaire 100, a computing system, mobile computing devices, or a combination thereof. In an example embodiment, one or more database entries for the luminaire 100 are changed, such that the identification number decoded from the incorrect fiducial pattern corresponds to the location of the luminaire 100. This change, in some embodiments, may involve reviewing all current database entries to avoid creating a duplicate entry. Once updated, the system is configured to transmit the database content to other system devices, such as computing systems or mobile computing devices, to ensure proper operation of the system. Such adjustments may be accomplished automatically or manually, depending on the application.

Fiducial pattern errors, in other instances, may also be corrected by changing the pattern and updating system information (i.e., maps or database information). In an example embodiment, upon notification that a fiducial pattern error exists, the luminaire 100 is configured to display a new (i.e., a pattern not currently used by the system) or different fiducial pattern (i.e., a pattern that was previously or is currently in use). In such an instance, the new pattern may exclude the non-functioning panel, but not in all instances. The non-functioning panel, for instance, may be incorporated into a fiducial pattern as a non-illuminated panel to create a new fiducial pattern. In some such instances, another luminaire 100 may already be assigned or otherwise associated with the identification number of the new fiducial pattern. As a result, in some instances, fiducial patterns for more than one luminaire 100 may change, along with any information associated with those patterns, as previously described herein, to ensure proper system operation.

In other embodiments, the system is configured to update software and/or application instructions, such that mobile computing devices can properly decode an improperly displayed fiducial pattern. Unlike other ways of correcting the fiducial pattern, such as adjusting light intensity levels, updating software can allow a fiducial pattern to be properly decoded despite one or more panels no longer being properly illuminated (e.g., light source failed). Upon identifying a fiducial pattern error, the system is configured to transmit decoding instructions for properly decoding the fiducial pattern. In an example embodiment, the instructions may identify one or more panels of the luminaire 100 and a particular adjustment value (e.g., scale up by 1.2). The adjustment value is an amount of change in light intensity applied to one or more pixels of the fiducial pattern image associated with an identified panel prior to decoding the fiducial pattern using the image to obtain navigation information. Numerous other variations and configurations for correct fiducial pattern errors will be apparent in light of the present disclosure.

Techniques for Improving Fiducial Pattern Resolution

As previously described, there are many challenges related to displaying light-based fiducial patterns for navigating an area. One particular challenge involves the ability of mobile computing devices to recognize or otherwise decode displayed fiducial patterns. This is a particular concern, when a device is located a significant distance away from the luminaire, such that the device has insufficient resolution to properly capture the displayed fiducial pattern. In more detail, as a mobile computing device moves further away from the luminaire, the image capturing sensor may no longer have a sufficient number of pixels to accurately record the fiducial pattern. As a result, the device cannot decode the pattern. Other challenges arise when the device is not located directly beneath the luminaire, but rather proximate to or otherwise adjacent to it. In such situations, the mobile computing device has a perspective view of the luminaire causing the device to receive less of the transmitted light from the luminaire. In more detail, due to the nature of light a mobile computing device located a distance away from the luminaire receives less transmitted light than a device located directly beneath the luminaire. As result, the device receives a fiducial pattern having differing light intensity values than an actual fiducial pattern transmitted by the luminaire. Thus, the received fiducial pattern is incorrect. To address these problems, techniques and architecture are disclosed for improving signal resolution by displaying alternating fiducial patterns of varying light intensities that transmit different bits of information recognizable at varying distances from the luminaire.

Figure 8F:
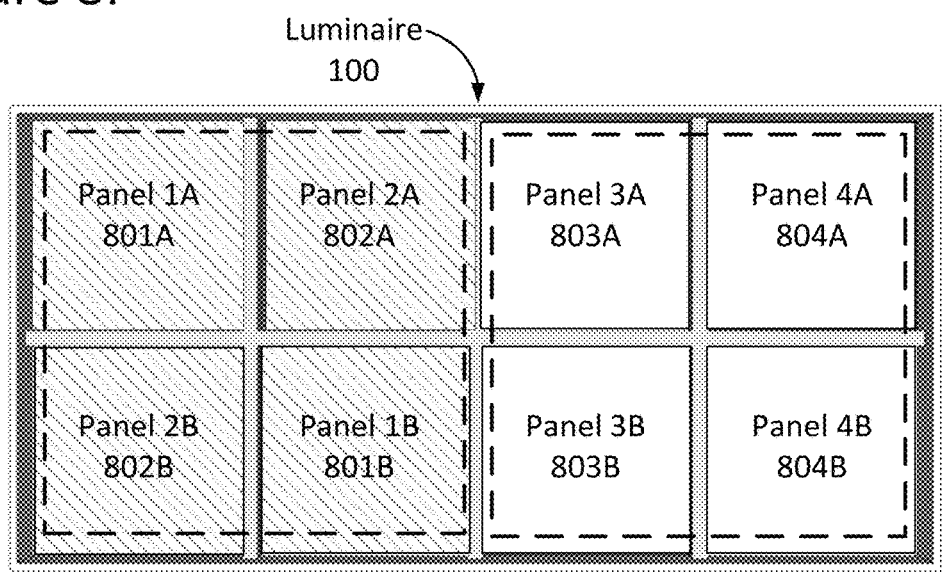
FIG. 8F illustrates a bottom view of an example multi-panel luminaire configured to generate a coarse light-based fiducial pattern, in accordance with an embodiment of the present disclosure.

FIG. 8F illustrates a bottom view of an example multi-panel luminaire 100 configured to generate a coarse fiducial pattern, in accordance with an embodiment of the present disclosure, to enable mobile computing devices to decode fiducial patterns from both distances near and far. In example embodiment, the luminaire 100 includes panels with dimensions of 24"×24" or 24"×48". The luminaire 100 may include from 4 to 100 panels, depending on the size of the individual panels. Luminaires 100 can be positioned between 6-20 feet above mobile computing devices within the area. The mobile computing devices may include sensors, such as cameras, with resolutions between 1 to 20 megapixels to detect light from individual panels of the luminaire 100. To communicate with mobile computing devices located at long distances from the luminaire 100, the luminaire 100 is configured to display a course fiducial pattern. A coarse fiducial pattern is a pattern created by groups of luminaire panels that when illuminated appear as one large panel. This large panel can be easily recognized by mobile computing devices, even at long distances, because of the panel's large size as compared to smaller individual panels. In an example embodiment, a course fiducial pattern is created using 24"×24" panels of the luminaire 100. The panels can be separated from one another by distances of 0 to 60". Thus, the panels of the luminaire 100 can span 48" to hundreds of feet depending on the spacing and number of individual panels. Coarse fiducial patterns, however, transmit less of information, because the luminaire displays fewer bits of information (i.e., a few large panels rather than several smaller panels). Fewer larger panels are displayed on the luminaire at any one time because of the fixed size of the luminaire 100. For instance, a 2×4 luminaire 100 having 8 panels, as shown in FIG. 8F, can be configured to transmit 256 different fiducial patterns when each panel of the luminaire is used to generate a fiducial pattern. Each fiducial pattern represents information (e.g. a message) containing bits of information represented by individual panels, as previously described. When the panels are grouped together to create two large panels (as indicated by the dotted lines), the luminaire is now configured to transmit fewer fiducial patterns containing less bits information (e.g., binary information of 01 or 10 vs. 01101101) because multiple panels are now used to create a single bit of information (i.e., one large panel).

Figure 8G:
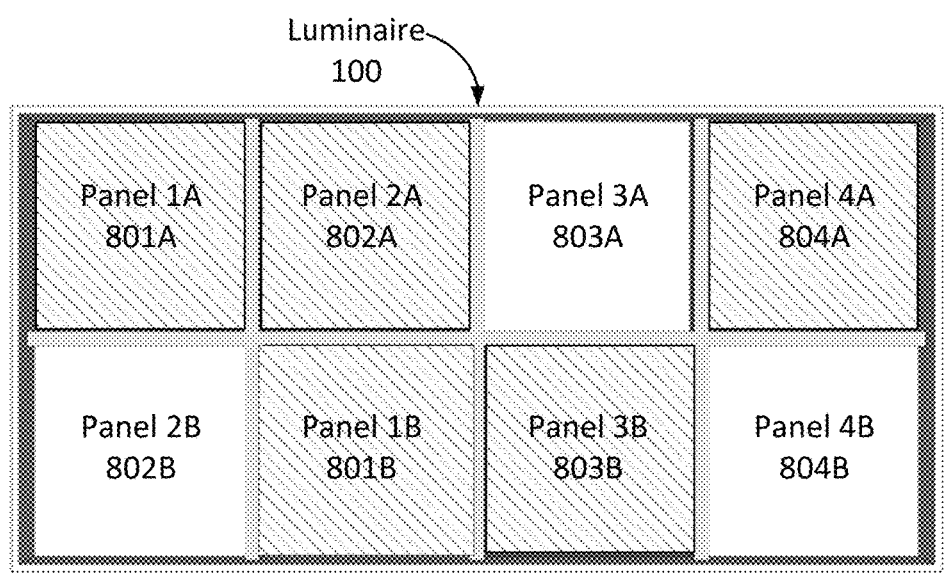
FIG. 8G illustrates a bottom view of an example multi-panel luminaire configured to generate a fine light-based fiducial pattern, in accordance with an embodiment of the present disclosure.

FIG. 8G illustrates a bottom view of an example multi-panel luminaire 100 configured to generate a fine light-based fiducial pattern, in accordance with an embodiment of the present disclosure. To communicate with a mobile computing device at near distances (e.g., when the device is located directly underneath the luminaire), the message mode is also configured to display fine fiducial patterns. A fine fiducial pattern is a pattern that includes several different panels of varying illumination. This is illustrated in FIG. 8G, in which the luminaire 100 is configured to display a fine fiducial pattern using eight luminaire panels (i.e., 1A-4B) having varying levels of light intensity. Unlike coarse fiducial patterns that transmit small amounts of information, fine fiducial patterns can transmit larger amounts of information using several luminaire panels. In addition, fine fiducial patterns can communicate specific locations within an area, rather than merely a general location. For instance, a fine fiducial pattern may indicate a particular location within a store (e.g., aisle 3, 10 feet from end), while a coarse fiducial pattern, on the other hand, may identify a section (e.g., sporting goods or household items) or point of interest (e.g., North entrance or restrooms) of an area.

Using both coarse and fine fiducial patterns, the luminaire 100 is configured to communicate with mobile computing devices that are both near and far. In an example embodiment, the luminaire 100 is configured to alternate between fiducial patterns during a portion of the operating period, for instance when in message mode. In more detail, while in message mode, the time for transmitting both fiducial patterns, in an example embodiment, is approximately 20 milliseconds. This duration is divided evenly between the coarse and fine fiducial patterns, such that each fiducial pattern is displayed for approximately 10 milliseconds, but not in all instances. In other instances, for example, coarse and fine fiducial patterns may be display for different lengths of time depending on the application. If the primary purpose of the luminaire, for instance, is direct a user to an area where the user needs little additional navigation instructions (e.g., location emergency exit, where exit is clearly visible from a location under the luminaire 100), then the coarse pattern may be displayed for 15 milliseconds, while the fine fiducial pattern is shown for 5 milliseconds. Numerous other variations and configurations for improving signal resolution will be apparent in light of the present disclosure.

In some instances, the mobile computing device may be positioned relative to the luminaire 100, such that, the computing devices receive an incorrect fiducial pattern as a result of device position. For instance, when the device is not directly located beneath the luminaire 100, such that the device is at unequal distances to the luminaire panels, some luminaire panels may appear brighter or dimmer due to the nature of light. As a result, the mobile computing device may receive an incorrect fiducial pattern. There are several ways to avoid fiducial pattern errors caused by mobile computing device position. One way, for instance, is to decode fiducial patterns using a calculated relative light intensity value instead of received light intensity measurements. In more detail, the mobile computing device, in some embodiments, is configured to measure the light intensity values for all luminaire panels to determine an average light intensity value. Once measured, the average light intensity value is subtracted from each measured light intensity value to identify positive and negative light intensity values. Positive light intensity values indicate a panel is illuminated with greater light intensity than the calculated average and thus, is a high bit panel (i.e., panel is a 1 in binary form). Negative light intensity values, on the other hand, indicate the panel is illuminated with less light intensity than the calculated average, and thus is a low bit panel (i.e., panel is 0 in binary form). This way of decoding fiducial patterns avoids errors because the pattern is decoded based on a calculated relative light intensity value for the luminaire rather than direct measurements of light intensity which may be in accurate due computing device position.

Fiducial pattern errors caused by mobile computing device position may also be avoided by calculating the distance between the luminaire and the computing device. In example embodiment, the computing device is configured to measure the relative distance to the luminaire using hardware such as an image capture device (e.g., a camera) and sensors 260 (e.g., gyroscopic sensor 267). Information, such as field of view, zoom range, focus settings for the image sensor along with luminaire information (e.g., fixture dimensions) are also used to calculate the position of the computing device from the luminaire 100. Once calculated, the distance from the computing device to the luminaire 100 is used to adjust the recorded or otherwise captured image of the fiducial pattern. In such an instance, the computing device, using a receiving algorithm, determines an average light intensity value based on each panels distance from the computing device. Once determined, the average light intensity value is subtracted from light intensity value for each pixel of the fiducial pattern image, such that the image can now be properly decoded. Upon subtraction of the determined average light intensity value, a positive light intensity value indicates a panel is illuminated with greater light intensity than the calculated average value and thus, is a high bit panel (i.e., panel is a 1 in binary form). A negative light intensity value, on the other hand, indicates the panel is illuminated with less light intensity than the calculated average, and thus is a low bit panel (i.e., panel is 0 in binary form). After the pixels of the image are adjusted to indicate positive and negative light intensity values, the image can be decoded to determine the navigation information (e.g., a luminaire identification number). This way of decoding fiducial patterns avoids errors caused by device position because the image is adjusted based position of the computing device relative to the luminaire rather direct measurements of light intensity.

Techniques for Masking Luminaires

As previously mentioned, there are many challenges related to displaying light-based fiducial patterns for navigating an area. One particular challenge concerns the complexity of transmitting light-based communication signals. Light-based communication systems and components involve many different types of hardware and software components that are individually complex and technically challenging to integrate with one another. Moreover, complex hardware, such as drivers for instance, are typically expensive and not always readily available. To address these problems, techniques and architecture are disclosed for converting uniform light fixtures (i.e., fixtures without or only a single panel) into a multi-panel light fixture configured to display a fiducial pattern for navigating an area.

Light-based fiducial patterns, as previously described, can be created using multi-panel luminaires illuminated with varying amounts of light. Single panel or non-panel light fixtures, such as those that provide a uniform amount of light (e.g., uniform light fixtures), cannot display fiducial patterns because the light appears with no noticeable variation in light intensity among the light sources (e.g., no discernable pattern). As described herein, a uniform light fixture can be modified to create a fiducial pattern. Such modifications can be created using for instance, a mask, to generate a light-based fiducial pattern that is recognizable by passing mobile computing devices. The mobile computing devices, in turn, are configured to decode navigation information, as previously described. Note, in this instance the pattern is created without changing a level of light intensity. Thus, such configurations are less expensive and easier to deploy because the luminaire does not use complex hardware and software elements, such as drivers and programming instructions, to produce a light-based fiducial pattern.

Figure 9A:
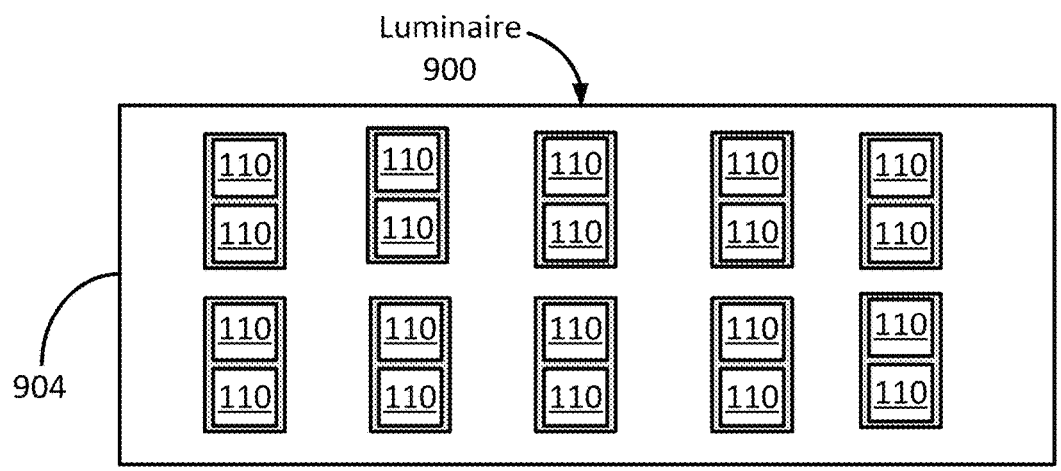
FIG. 9A illustrates a bottom view of an example non-panel luminaire, in accordance with an embodiment of the present disclosure.

FIG. 9A illustrates a bottom view an example non-panel luminaire 900, in accordance with an embodiment of the present disclosure. In an example embodiment, a luminaire, such as a uniform light fixture, includes a housing (or ceiling mount) with a plurality of light sources (e.g., LEDs) disposed therein. This is illustrated in FIG. 9A, in which the luminaire 900 includes a housing 904 and a plurality of light sources 110. The light sources 110 are configured to provide a uniform light intensity level (as indicated by the unshaded boxes). The luminaire 900, in this instance, includes no panels but rather is configured to receive to a physical mask, such as a grid-based frame work that effectively divides the luminaire into panels.

Figure 9B:
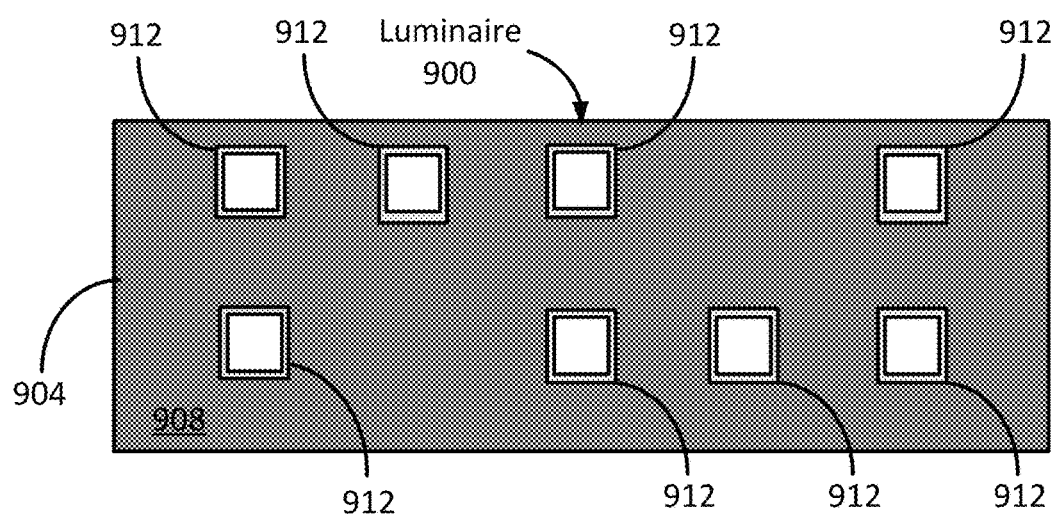
FIG. 9B illustrates a bottom view of an example non-panel luminaire including a physical mask defining several panels that when illuminated form a fiducial pattern, in accordance with an embodiment of the present disclosure.

FIG. 9B illustrates an example non-panel luminaire 900 including a mask 908 defining several panels 912 that when illuminated form a fiducial pattern, in accordance with an embodiment of the present disclosure. A mask is a device, for instance a panel, which is configured to modify the amount of light transmitted by a light fixture, such as 2x4 luminaire. The amount of illumination provided by the light fixture can be modified by transmitting the light non-uniformly through the mask. The light can be transmitted through various semi-transparent or transparent portions of the mask to create a light-based fiducial pattern. The transmission of light can be altered or otherwise modified using a mask to: (1) inhibit (e.g., block), (2) reduce or limit (e.g., dim) or (3) change a polarity or direction (e.g., filter).

As can be seen in FIG. 9B, the mask 908, when installed on the luminaire 900, creates the appearance of one or more panels 912 that when illuminated by the light sources (e.g., light sources 110 from FIG. 9A) form a fiducial pattern. In this instance, the panels 912 are transparent (as indicated by the unshaded boxes) and thus, allow light to easily pass through the panel 912 to illuminate the area and create the fiducial pattern. The remaining portion of the mask 908 is opaque (as indicated by the shaded areas) and thus, inhibits or obstructs the transmission of light from adjacent light sources 110. The contrast in light transmission between portions of the mask 908 having panels 912, and those portions without panels 912, enhances the appearance of the fiducial pattern. In other instances, however, the panels 912 may be semi-transparent providing a softer lighting experience. Similarly, the non-panel areas of the mask 908 may also be semi-transparent to provide a maximum amount of illumination to the area while continuing to display a recognizable fiducial pattern. In this way, more light from the light sources illuminates the area about the luminaire 900. Another way to increase the illumination of the area is to install the mask 908 over a portion of the luminaire 900 rather than the entire fixture. In such an instance, mask 908 can be configured to cover 10%, 25%, 50% or 75% of the luminaire 900 and thus, allow the remainder of the luminaire 900 to function as designed (e.g., as a uniform light fixture).

The mask 908, in some embodiments, may also include or otherwise be coupled to other devices, such as diffusers, to improve the lighting experience. In some such embodiments, a diffuser and the mask 908 are attached or otherwise positioned in front of the light sources disposed within the luminaire 900. The diffuser, in an example embodiment, is configured to be positioned between the mask 908 and light sources, but not in all instances. The diffuser, in some other embodiments, can be on the same level with as the mask 908, for instance when the diffuser is incorporated into the mask 908. No matter its position, the diffuser is configured to scatter the light from the light sources to provide a soft light appearance.

Figure 9C:
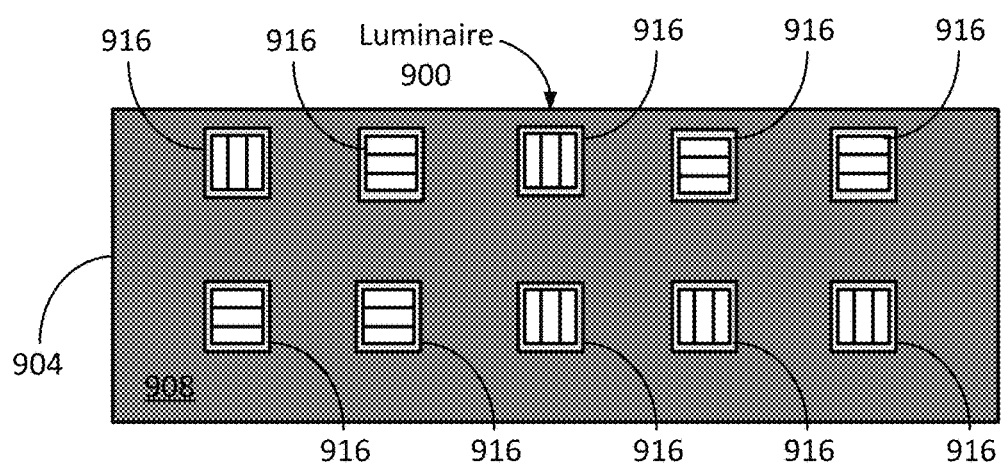
FIG. 9C illustrates a bottom view of an example non-panel luminaire configured with a physical mask including several polarized lenses, in accordance with an embodiment of the present disclosure.

FIG. 9C illustrates an example non-panel luminaire 900 configured with a mask 908 including several polarized lenses 916, in accordance with an embodiment of the present disclosure. In some instances, changing the appearance or display of light transmitted by the luminaire 900, for example by using diffusers to soften light appearance, may not be desirable. In some areas, such as office spaces for instance, changing the appearance of light transmitted by the luminaire 900 may adversely affect the function of the area, because people in area need higher levels of light intensity to function within the space. For such areas, the luminaire 900 can be configured with a mask 908 that includes polarized lens 916 in place of the panels (e.g., panels 912 of FIG. 9B). This is illustrated in FIG. 9C, in which polarized lens 916 are incorporated into mask 908. A polarized lens 916 is an optical filter that allows the transmission of light in a particular direction (e.g., vertical direction) and blocks the transmission of light in other directions (e.g., horizontal direction). Transmitting light through a polarized lens 916 to create a fiducial pattern enables a mobile computing device, such as one configured with one or more optical sensors with a polarizing lens, to detect the pattern without any noticeable change in the amount of light provided by the luminaire 900. Thus, the fiducial pattern is not recognizable to the human eye. In this instance, a portion of the light produced by the light sources of the luminaire 900 is removed (e.g., filtered) and polarized light produced by the light sources is transmitted through the lens 916. Note, that in such instances, the mobile computing device is positioned to receive the polarized light. This may involve aligning the device to receive the filtered signal. In other instances, the device includes two or more image capture devices (e.g., two or more cameras) with different orientations (e.g., 45 degree offset from one another) to enable the device to receive the polarized light regardless of its alignment relative to the luminaire 900 and/or the polarized light signals.

FURTHER CONSIDERATIONS

As previously described, the fiducial pattern can be used to calculate both a relative position of the mobile computing device from the luminaire and determine an identified position of the luminaire within an area. In some embodiments, the system is configured to use the fiducial pattern to locate a luminaire position, but not determine relative position of the device in relation to the luminaire. In such embodiments, the system is configured to determine a position of the mobile computing device relative to the luminaire based on the general shape of the light from the fiducial pattern transmitted by the luminaire. Thus, the system can determine a position of the mobile computing device relative to the luminaire without determining the location of the luminaire based on the light-based fiducial pattern (e.g., when the mobile computing device is a long distance from the luminaire). The system, in an example embodiment, is configured to determine a position of the mobile computing device relative to the luminaire, such as 2' north and 3' west of the luminaire, in response to receiving an image that includes a general shape (e.g., rectangle or square) of the light defined by the fiducial pattern transmitted by the luminaire. The system, in some embodiments, is configured to determine a relative position of the mobile computing device from luminaire prior to determining a luminaire position. The relative position of the mobile computing device from the luminaire can be combined with other information (e.g., the location of previous luminaires passed by the computing device) to determine an identity and/or location of the luminaire. As a result, luminaire position and mobile computing device position are now decoupled, such that each process can be configured independently of the other.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:
1. A luminaire comprising:
a plurality of panels, each panel associated with one or more solid-state light sources, wherein the one or more solid-state light sources are configured to produce light; and
at least one driver configured to:
control the one or more solid-state light sources to transmit light through the plurality of panels at varying light intensities to display a first fiducial pattern recognizable by a mobile computing device, wherein the first fiducial pattern represents position information;
detect an error in the display of the first fiducial pattern by monitoring electrical current to the one or more solid-state light sources in each of the plurality of panels, wherein an error is detected when a difference between the monitored electrical current and a stored electrical current exceeds a threshold; and
control the one or more solid-state light sources to display a coarse fiducial pattern when the mobile computing device is located a long distance from the luminaire and a fine fiducial pattern when the mobile computing device is located near the luminaire.

2. The luminaire of claim 1, wherein the plurality of panels includes at least one fault indicator panel configured to indicate an error in the display of the first fiducial pattern to the mobile computing device.

3. The luminaire of claim 2, wherein the fault indicator panel is illuminated and forms part of the first fiducial pattern when there is no error in the display of the first fiducial pattern.

4. The luminaire of claim 1, wherein the luminaire further comprises a communication module configured to transmit the changes in electrical current to a computing system, wherein the computing system is configured to detect an error in the display of the first fiducial pattern.

5. The luminaire of claim 1, wherein in response to detecting an error in the display of the first fiducial pattern, the driver is further configured to control the one or more solid-state light sources to display a second fiducial pattern in place of the first fiducial pattern.

6. The luminaire of claim 1, wherein the coarse fiducial pattern represents fewer bits of information than the fine fiducial pattern.

7. The luminaire of claim 1, wherein the first fiducial pattern defines a shape such that a relative position of a mobile computing device from the luminaire is determined based on the shape of the first fiducial pattern.

8. The luminaire of claim 1, wherein the driver is further configured to operate the luminaire in a first mode and a second mode, wherein:
the first mode comprises operating the one or more solid-state light sources at a first light intensity level; and
the second mode comprises operating the one or more solid-state light sources at a second light intensity level different from the first light intensity level in order to display the first fiducial pattern.

9. The luminaire of claim 8, wherein the first light intensity level is a full light intensity level and the first mode further comprises modulating the frequency of light output to provide one or more light-based communication messages.

10. The luminaire of claim 1, wherein the at least one driver is further configured to control the one or more solid-state light sources to alternate between displaying the coarse fiducial pattern and the fine fiducial pattern.

11. A system for navigating an area, the system comprising:
a plurality of multi-panel luminaires located in the area, each multi-panel luminaire configured to display a fiducial pattern recognizable by a mobile computing device, wherein the fiducial pattern represents position information; and
a computing system in communication with the plurality of multi-panel luminaires via a network and configured to:
detect an error in the display of at least one fiducial pattern displayed by a first multi-panel luminaire by monitoring electrical current to one or more solid-state light sources in each of the plurality of multi-panel luminaires, wherein an error is detected when a difference between the monitored electrical current and a stored electrical current exceeds a threshold; and
control the first multi-panel luminaire to display a coarse fiducial pattern when the mobile computing device is located a long distance from the first multi-panel luminaire and a fine fiducial pattern when the mobile computing device is located near the first multi-panel luminaire.

12. The system of claim 11, wherein each multi-panel luminaire further comprises:
   a plurality of panels, each panel associated with one or more solid-state light sources, wherein the one or more solid-state light sources are configured to produce light; and
   at least one driver configured to control the one or more solid-state light sources by varying light intensities to display the fiducial pattern.

13. The system of claim 12, wherein each multi-panel luminaire further comprises a fault indicator panel configured to indicate an error in the display of the fiducial pattern.

14. The system of claim 11, wherein the computing system is further configured to transmit instructions to the first multi-panel luminaire and in response the first multi-panel luminaire adjusts the displayed fiducial pattern from a first fiducial pattern produced by a first combination of solid-state light sources to a second fiducial pattern produced by a second combination of solid-state light sources.

15. The system of claim 14, wherein the instructions are transmitted in response to detecting an error in the display of the fiducial pattern by the first multi-panel luminaire.

16. The system of claim 11, wherein in response to detecting the error the computing system is further configured to update at least one of a map and database content stored on the computing system, wherein the mobile computing device uses at least the map and the database content to adjust a received image of the fiducial pattern on the mobile computing device.

17. The system of claim 11, wherein the computing system is further configured to control the first multi-panel luminaire to alternate between displaying the coarse fiducial pattern and the fine fiducial pattern.

18. A luminaire comprising:
   a housing with one or more solid-state light sources disposed therein;
   at least one driver configured to control the one or more solid-state light sources to produce an output of light; and
   a mask attached to the housing and positioned over at least one of the solid-state light sources, the mask being opaque with one or more transparent sections defining one or more panels configured to transmit the output of light to display a fiducial pattern that is recognizable by a mobile computing device, wherein the fiducial pattern represents position information;
   wherein the luminaire is configured to:
      detect an error in the display of the fiducial pattern by monitoring electrical current to the one or more solid-state light sources, wherein an error is detected when a difference between the monitored electrical current and a stored electrical current exceeds a threshold; and
      control the one or more solid-state light sources to display a coarse fiducial pattern when the mobile computing device is located a long distance from the luminaire and a fine fiducial pattern when the mobile computing device is located near the luminaire.

19. The luminaire of claim 18, further comprising a diffuser attached to the housing and positioned between the solid-state light sources and the mask.

20. The luminaire of claim 18, wherein the mask further comprises one or more polarized lenses that polarize light produced by the solid-state light sources such that the fiducial pattern is not visually detectable by a human eye.

21. The luminaire of claim 18, wherein the luminaire is further configured to control the one or more solid-state light sources to alternate between displaying the coarse fiducial pattern and the fine fiducial pattern.

* * * * *